US007163282B2

(12) United States Patent
Kumagai et al.

(10) Patent No.: US 7,163,282 B2
(45) Date of Patent: Jan. 16, 2007

(54) VALVE UNIT AND LIQUID EJECTING APPARATUS

(75) Inventors: Toshio Kumagai, Suwa (JP); Atsushi Kobayashi, Suwa (JP); Yoshiharu Aruga, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 389 days.

(21) Appl. No.: 10/870,448

(22) Filed: Jun. 18, 2004

(65) Prior Publication Data

US 2006/0152563 A1 Jul. 13, 2006

(30) Foreign Application Priority Data

| | | |
|---|---|---|
| Jun. 20, 2003 | (JP) | 2003-177050 |
| Sep. 5, 2003 | (JP) | 2003-314516 |
| Oct. 14, 2003 | (JP) | 2003-353548 |

(51) Int. Cl.
*B41J 2/175* (2006.01)
*F16K 31/18* (2006.01)
*F16K 51/00* (2006.01)

(52) U.S. Cl. ...................... 347/85; 137/447; 251/149.2

(58) Field of Classification Search .................. 347/84, 347/85, 87; 137/247.19, 250, 447, 448; 251/88, 251/149.2, 160
See application file for complete search history.

(56) References Cited

U.S. PATENT DOCUMENTS

| | | | | |
|---|---|---|---|---|
| 3,941,149 | A * | 3/1976 | Mittleman | 137/493.1 |
| 4,677,447 | A * | 6/1987 | Nielsen | 347/87 |
| 5,040,002 | A * | 8/1991 | Pollacek et al. | 347/87 |
| 6,000,788 | A * | 12/1999 | Iida | 347/86 |
| 6,186,414 | B1 * | 2/2001 | Clearman et al. | 239/214 |
| 6,474,623 | B1 * | 11/2002 | Davies | 251/298 |
| 6,685,307 | B1 | 2/2004 | Dowell et al. | |
| 6,926,396 | B1 * | 8/2005 | Ota et al. | 347/86 |
| 6,929,357 | B1 * | 8/2005 | Qingguo et al. | 347/85 |

FOREIGN PATENT DOCUMENTS

| | | |
|---|---|---|
| JP | 09-11488 A | 1/1997 |
| JP | 10-250096 A | 9/1998 |
| JP | 2001-38925 A | 2/2001 |
| WO | WO03/041964 A1 | 5/2003 |

* cited by examiner

*Primary Examiner*—Anh T. N. Vo
(74) *Attorney, Agent, or Firm*—Sughrue Mion, PLLC

(57) ABSTRACT

The pressure of a pressure chamber decreases as liquid is ejected from an ejecting head. A valve element of a valve unit is provided inside the pressure chamber. The valve element has a power point part, fulcrum part and application point part. The power point part is subject to a pushing force in accordance with a decline in the pressure of the pressure chamber. The fulcrum part supports the valve element with respect to a wall surface defining the pressure chamber such that the valve element rotates. The application point part separates from the valve seat as the valve element rotates. The fulcrum part is not fixed to the wall surface. Hence, the valve unit operates favorably in accordance with the pressure of ink.

31 Claims, 10 Drawing Sheets

VALVE UNIT AND LIQUID EJECTING APPARATUS

BACKGROUND OF THE INVENTION

1. Field the Invention

The present invention relates to a valve unit and a liquid ejecting apparatus.

2. Description of the Related Art

An inkjet recording apparatus is conventionally used as a liquid ejecting apparatus that ejects liquid from a nozzle towards a target. An inkjet recording apparatus includes a carriage and a recording head that is mounted on the carriage. Printing is performed on a recording medium by discharging ink from nozzles formed in the recording head while moving the carriage with respect to the recording medium as a target.

Most kinds of inkjet recording apparatus, which are mainly utilized for home use, employ an "on-carriage type" configuration in which a plurality of ink cartridges for supplying ink to the recording head are detachably mounted on the aforementioned carriage. However, the capacity of ink cartridges in the on-carriage type of inkjet recording apparatus is limited, and when attempting to carry out a comparatively large amount of printing it is necessary to frequently replace the ink cartridges, involving time and trouble for the user.

To overcome this problem, an "off-carriage type" configuration is sometimes employed in which large-capacity ink cartridges are disposed on the case side of the inkjet recording apparatus. More specifically, the off-carriage type inkjet recording apparatus supplies ink from each of the large-capacity ink cartridges via flexible tubes to a recording head mounted on a carriage.

However, in the off-carriage type configuration, due to the routing of the tube, large pressure variations may arise in the tube running from the ink cartridges to the carriage. This decreases the efficiency of the discharge of ink from the recording head.

An inkjet recording apparatus that can solve the aforementioned problems is disclosed in, for example, International Publication No. WO 03/041964. More specifically, in the inkjet recording apparatus disclosed in that publication, ink from ink cartridges disposed in the case is received by a valve unit having a self-sealing function that is mounted on a carriage. This valve unit is equipped with an ink introducing chamber and pressure chamber, and ink supplied from the ink cartridge is fed from the ink introducing chamber to a recording head through the pressure chamber. A valve is provided between the ink introducing chamber and pressure chamber, and the opening and closing of this valve respectively enables and disenables communication between the ink introducing chamber and pressure chamber.

Accompanying a decrease in the amount of ink inside the pressure chamber, a film member compartmentalizing one part of the pressure chamber is displaced, and that displacement is directly transferred to the valve to actuate the valve.

When ink is consumed at the recording head the ink amount in the pressure chamber decreases to lower the pressure in the pressure chamber, whereby the valve enters an open state and ink is supplied from the ink introducing chamber to the pressure chamber. Thus, ink is supplied to the pressure chamber in accordance with the amount of ink consumed at the recording head, and the effect of pressure changes in the tube disposed on the upstream side of the valve unit are not transmitted to the recording head.

The inkjet recording apparatus disclosed in the aforementioned publication pressurizes ink in the ink cartridges with air to supply ink in a pressurized state to the valve unit via a tube. However, in the above publication, since the valve has a plate part that receives pressure from the ink supply side that is disposed in the ink introducing chamber, the pressure-receiving area of the valve is large. Accordingly, when ink is supplied in a pressurized state to the valve unit, the valve receives the effect of the supply pressure of the ink, thereby generating a hindrance to the working of the valve. This diminishes the self-sealing function of the valve unit and lowers the ink supply performance.

The configuration of a valve unit that is less subject to the influence of the supply pressure of ink is disclosed, for example, in Japanese Laid-Open Patent Publication No. 9-11488. More specifically, the valve unit disclosed in this publication includes a back pressure regulator that regulates the pressure of ink supplied to the recording head. This back pressure regulator is equipped with a diaphragm, a diaphragm piston, a lever, a valve seat and a nozzle.

When the back pressure (pressure on the side of the recording head past the diaphragm) in the recording head drops below a predetermined value, force is applied to the diaphragm piston by the diaphragm to rotate the lever, whereby the valve seat provided at the lever detaches from the nozzle. As a result, ink flows to the recording head.

In this Japanese Laid-Open Patent Publication No. 9-11488, while the supply pressure of ink is applied to a valve seat via a nozzle, the part of the valve seat to which pressure is applied is only the part that faces the nozzle, and the pressure-receiving area of that part is small. Therefore, the valve seat is less subject to the influence of the ink supply pressure, and even when supplying ink in a pressurized state, an influence on the function of the back pressure regulator is less likely to arise.

However, due to the structure of the back pressure regulator it is difficult to align the two contacting surfaces of the valve seat and the nozzle, and the sealing properties between the valve seat and the nozzle may be diminished. As a result, the function of the back pressure regulator may be diminished.

SUMMARY OF THE INVENTION

It is an object of the present invention to provide a valve unit and liquid ejecting apparatus that operate favorably in accordance with an ink pressure.

In order to achieve the above object, a valve unit of the present invention is provided part way along a liquid supply channel for supplying a liquid from a liquid reservoir part to a liquid ejecting head. The valve unit includes a pressure chamber that temporarily retains the liquid and an open/close valve that selectively permits supply of the liquid from the liquid supply channel to the pressure chamber. A retained amount of liquid in the pressure chamber decreases as the liquid is ejected from the liquid ejecting head. A pressure of the pressure chamber decreases accompanying the decrease in the retained amount of liquid. The open/close valve includes a valve seat, a valve element, and an urging member. The valve seat is provided between the liquid supply channel and the pressure chamber. The valve element is provided within the pressure chamber. When the valve element contacts the valve seat, the valve element prevents supply of the liquid from the liquid supply channel to the pressure chamber. When the valve element is separated from the valve seat, the valve element allows supply of the liquid from the liquid supply channel to the pressure chamber. The valve element has a power point part, a fulcrum part and an application point part. The power point part receives a pushing force in accordance with a decrease in pressure in the pressure chamber. The fulcrum part supports the valve element with respect to a wall surface defining the pressure chamber such that the valve element rotates as a result of the pushing force. The application point part separates from the valve seat accompanying rotation of the valve element caused by the pushing force. The fulcrum part is not fixed to the wall surface. The urging member urges the application point part towards the valve seat. The urging member and the valve seat face each other with the application point part in between.

Further, in order to achieve the above object, a liquid ejecting apparatus of this invention includes a liquid reservoir part that retains a liquid, a liquid ejecting head having a nozzle, wherein the head ejects a liquid from the nozzle towards a target, a liquid supply channel for supplying a liquid from the liquid reservoir part to the liquid ejecting head, and a valve unit provided part way along the liquid supply channel.

BRIEF DESCRIPTION OF THE DRAWINGS

The novel features of this invention will be apparent, in particular, from the claims attached hereto. The purposes and advantages of this invention will be understood by referring to the description of the current preferred embodiments set forth hereunder together with the attached drawings.

DETAILED DESCRIPTION OF THE PREFERRED EMBODIMENTS

Embodiments of This Invention are Described Hereunder

Figure 1:
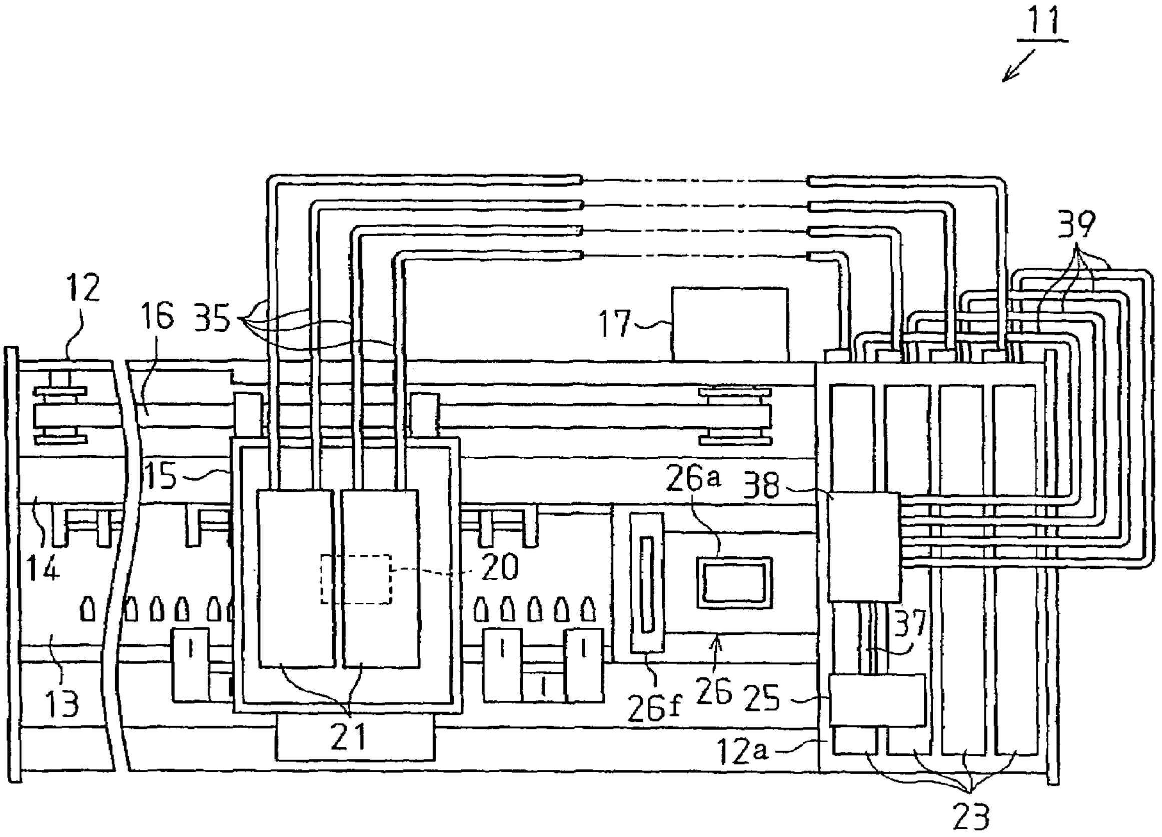
FIG. 1 is a plane view of an inkjet recording apparatus in one embodiment of this invention.

As shown in FIG. 1, an inkjet recording apparatus 11 as a liquid ejecting apparatus includes a main unit case 12, a platen 13, a guide shaft 14, a carriage 15, a timing belt 16, a carriage motor 17 and a recording head 20 as a liquid ejecting head. In addition, the inkjet recording apparatus 11 includes valve units 21, ink cartridges 23 as liquid reservoir parts, a pressure pump 25 comprising a pressure regulating mechanism, and a capping apparatus 26.

The main unit case 12 is a housing that is shaped as a roughly rectangular solid, and a cartridge holder 12*a* is formed in the far-right part of the view shown in FIG. 1. In this embodiment, the lengthwise direction of the main unit case 12 (direction from left to right in FIG. 1) is referred to as "main scanning direction."

The platen 13 is installed inside the main unit case 12 to extend along the main scanning direction, and supports a recording medium (not shown) as a target that is delivered via a paper feeding mechanism (not shown). In this embodiment, a recording medium is delivered in a direction that is orthogonal to the main scanning direction, namely, a sub scanning direction.

The guide shaft 14 is formed in a rod shape, and is installed inside the main unit case 12 in a direction parallel with the platen 13, i.e., such that it extends along the main scanning direction. The carriage 15 is inserted on the guide shaft 14 in a condition where it passes therethrough, such that the carriage 15 is movable with respect to the guide shaft 14 in a position facing the platen 13 and is capable of moving back and forth in the main scanning direction.

The carriage 15 is connected to the carriage motor 17 via the timing belt 16. The carriage motor 17 is supported by the main unit case 12, and by driving of the carriage motor 17, the carriage 15 is driven via the timing belt 16. Thus, the carriage 15 moves back and forth along the guide shaft 14.

Figure 3:
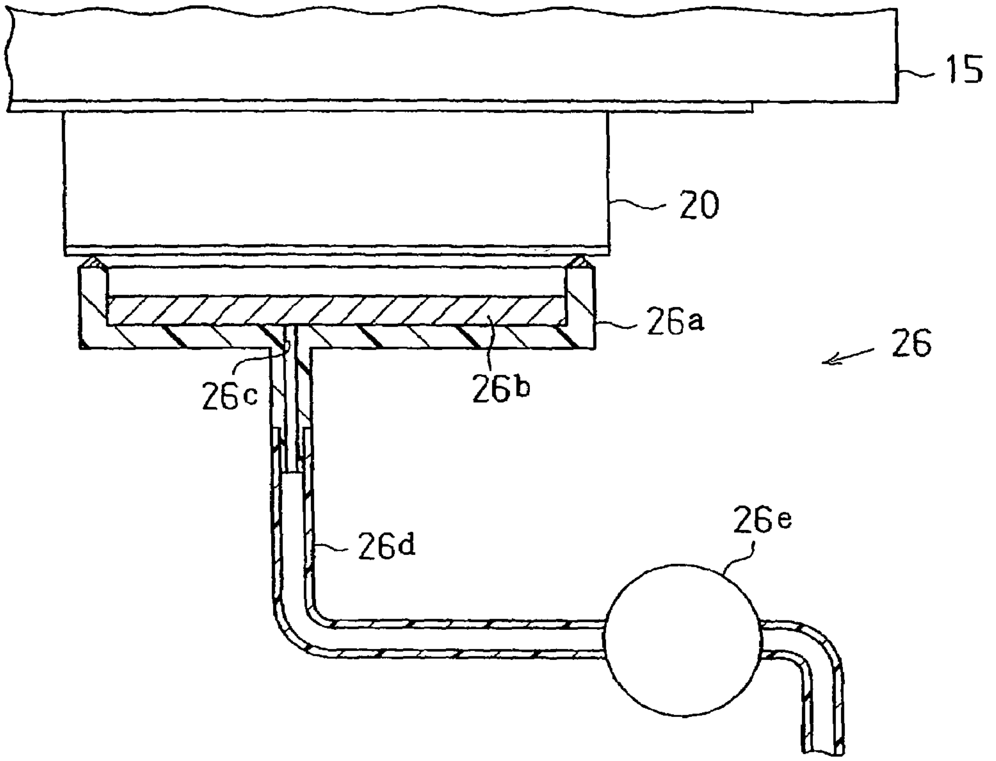
FIG. 3 is a cross-sectional view of a capping apparatus provided in the recording apparatus of FIG. 1.

As shown in FIG. 3, the recording head 20 is provided on a plane of the carriage 15, which faces the platen 13, and includes a plurality of nozzles (not shown) that eject ink as a fluid in the direction of the platen 13. The valve units 21 are mounted on the carriage 15 and supply ink that was temporarily retained to the recording head 20 in a state where the pressure thereof has been regulated. In this embodiment two valve units 21 are provided, and each of the valve units 21 is capable of regulating the pressure of two ink colors. In this embodiment, one of the valve units 21 regulates the pressure of black ink and yellow ink to be supplied to the recording head 20, and the other of the valve units 21 regulates the pressure of magenta ink and cyan ink to be supplied thereto, however the combinations may of course be changed to different colors.

Figure 2:
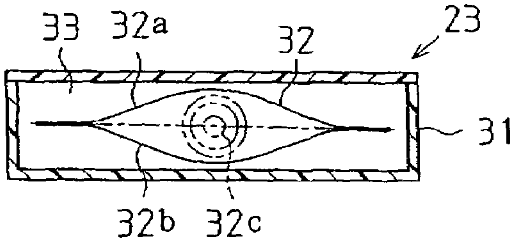
FIG. 2 is a cross-sectional view of an ink cartridge provided in the recording apparatus of FIG. 1.

The ink cartridges 23 are housed in a detachably mountable condition on the cartridge holder 12*a*, and four cartridges 23 are provided in correspondence to the aforementioned ink colors. FIG. 2 shows one of the four ink cartridges 23. The ink cartridges 23 include an ink pack 32 and an ink case 31 as a liquid housing part. The ink case 31 is shaped as a roughly rectangular solid. The ink pack 32 is formed by two overlapping films, films 32*a* and 32*b*, as two flexible members, and ink as a fluid is enclosed therein.

The ink pack 32 includes an ink outlet 32*c*, and is housed inside the ink case 31. At this time, only the ink outlet 32*c* is in a condition where it is exposed from the ink case 31, and the other parts are housed within the ink case 31 in an airtight condition. Accordingly, a clearance 33 as a compression chamber is formed between the ink case 31 and the ink pack 32.

A communicating hole (not shown) that communicates with the clearance 33 is provided in the ink case 31. By allowing the inflow of air to the clearance 33 via this communicating hole the pressure in the clearance 33 is raised, thereby enabling the generation of a force to squeeze the ink pack 32. As shown in FIG. 1, the ink outlet 32*c* of the ink pack 32 is connected to the valve units 21 via an ink supply tube 35 that is provided for each of the ink colors. The ink supply tubes 35 constitute liquid supply channels. Accordingly, by introduction of air into the clearance 33 within the ink case 31, ink within the ink pack 32 is supplied to the valve units 21 via the ink supply tube 35.

In this embodiment, the pressure pump 25 is fixed to the main unit case 12 in a condition where it is positioned over the ink cartridges 23. The pressure pump 25 can draw in atmospheric air and discharge it as pressurized air to supply the pressurized air to a pressure detecting device 38 via a pressure tube 37.

The pressure detecting device 38 detects the pressure of air supplied from the pressure pump 25. In this embodiment, driving of the pressure pump 25 is regulated on the basis of pressure detected by the pressure detecting device 38. Accordingly, by means of the pressure detecting device 38, air supplied from the pressure pump 25 is regulated such that the pressure thereof is within a predetermined range. The pressure detecting device 38 is connected to the communicating holes of the ink cartridges 23 via four air supply tubes 39, and air that was regulated such that the pressure thereof is within a predetermined range is introduced into the clearance 33 of the ink cartridges 23.

Thus, the ink pack 32 of each ink cartridges 23 is pressurized by pressurized air supplied from the pressure pump 25, whereby ink within the ink pack 32 is supplied to the valve unit 21 that corresponds thereto. Ink that was temporarily retained in the valve unit 21 is supplied to the recording head 20 in a state where the pressure thereof has been regulated.

At that time, based on image data, the carriage 15 is moved in the main scanning direction while a storage medium is transported in the sub scanning direction using the paper feeding mechanism, to thereby enable printing onto the recording medium by the ejection of ink from the recording head 20.

The capping apparatus 26 is provided in a non-printing region (home position) on the path of movement of the carriage 15. On the upper surface of the capping apparatus 26 is disposed a cap 26*a* that is formed of an elastic material, such as an elastomer, that can seal a nozzle forming face of the recording head 20 by adhering thereto. As shown in FIG. 3, when the carriage 15 has moved to the home position, the cap 26*a* moves (rises) towards the recording head 20 to seal the nozzle forming face of the recording head 20.

An absorber 26*b* that can absorb ink is disposed inside the cap 26*a*, and by sealing the nozzle forming face of the recording head 20 by means of the cap 26*a* during an idle period of the inkjet recording apparatus 11, the inside of the cap 26*a* is maintained in a state of high humidity to prevent an increase in the viscosity of the ink. Sponge or the like may be used as a material of the absorber 26*b*, although the material is not limited thereto, and any material may be used as long as it is capable of absorbing and retaining ink.

On the bottom of the cap 26*a* is provided a discharge outlet 26*c* for discharging ink, bubbles, impurities and the like. A first end of an ink discharge tube 26*d* is connected to the discharge outlet 26*c*. A second end of the ink discharge tube 26*d* is connected to a waste liquid tank (not shown).

A tube pump 26*e* is provided part way along the ink discharge tube 26*d*. A vacuum is generated within the cap 26*a* by a drawing action of the tube pump 26*e*. By the action of the vacuum, ink for which the viscosity has risen, dust, and bubbles inside the recording head 20 that are generated, for example, by cartridge replacement and the like are discharged via the ink discharge tube 26*d* to the waste liquid tank. Accordingly, a “cleaning operation” can be carried out.

Meanwhile, as shown in FIG. 1, in the capping apparatus 26 a wiping member 26*f* that is formed in a rectangular shape using an elastic material, such as rubber, is provided such that it adjoins the printing region side of the cap 26*a*. The wiping member 26*f* can wipe the nozzle forming face to conduct cleaning thereof by, as required, advancing into the path of movement of the recording head 20.

Next, the valve units 21 will be described in detail.

As shown in FIG. 4 to FIG. 9, the valve units 21 include a unit case 41 as a channel-forming member, a first and second filter 43*a* and 43*b*, a first film member 45 as a first flexible member, and a first and second fitting member 47*a* and 47*b*. The valve units 21 further include a first and second valve member 49*a* and 49*b* that function as open/close valves, a second film member 51 as a second flexible member, and a first and second pressure plate 53*a* and 53*b*.

Figure 7:
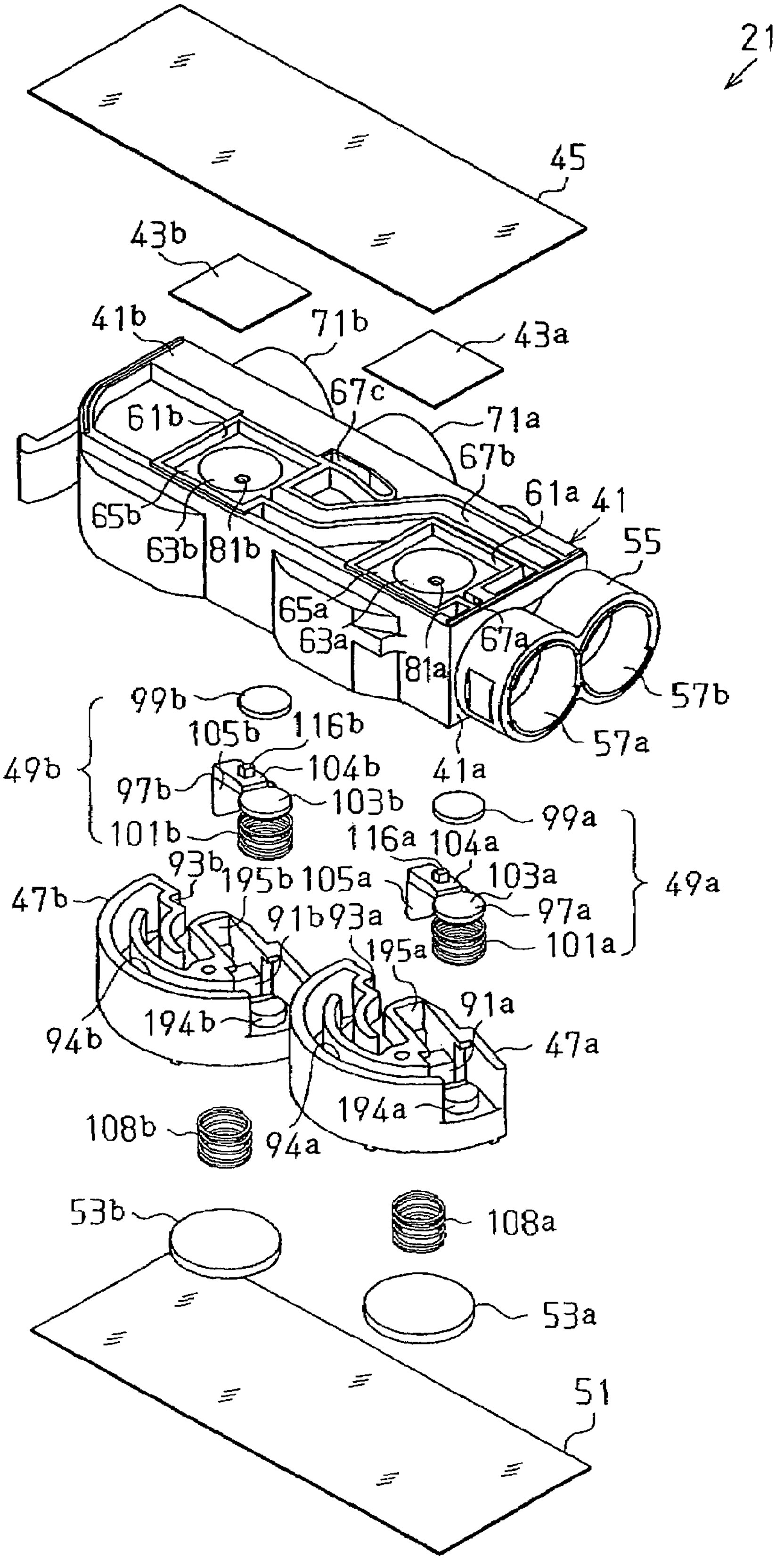
FIG. 7 is an exploded perspective view of the valve unit of FIG. 6.
Figure 8:
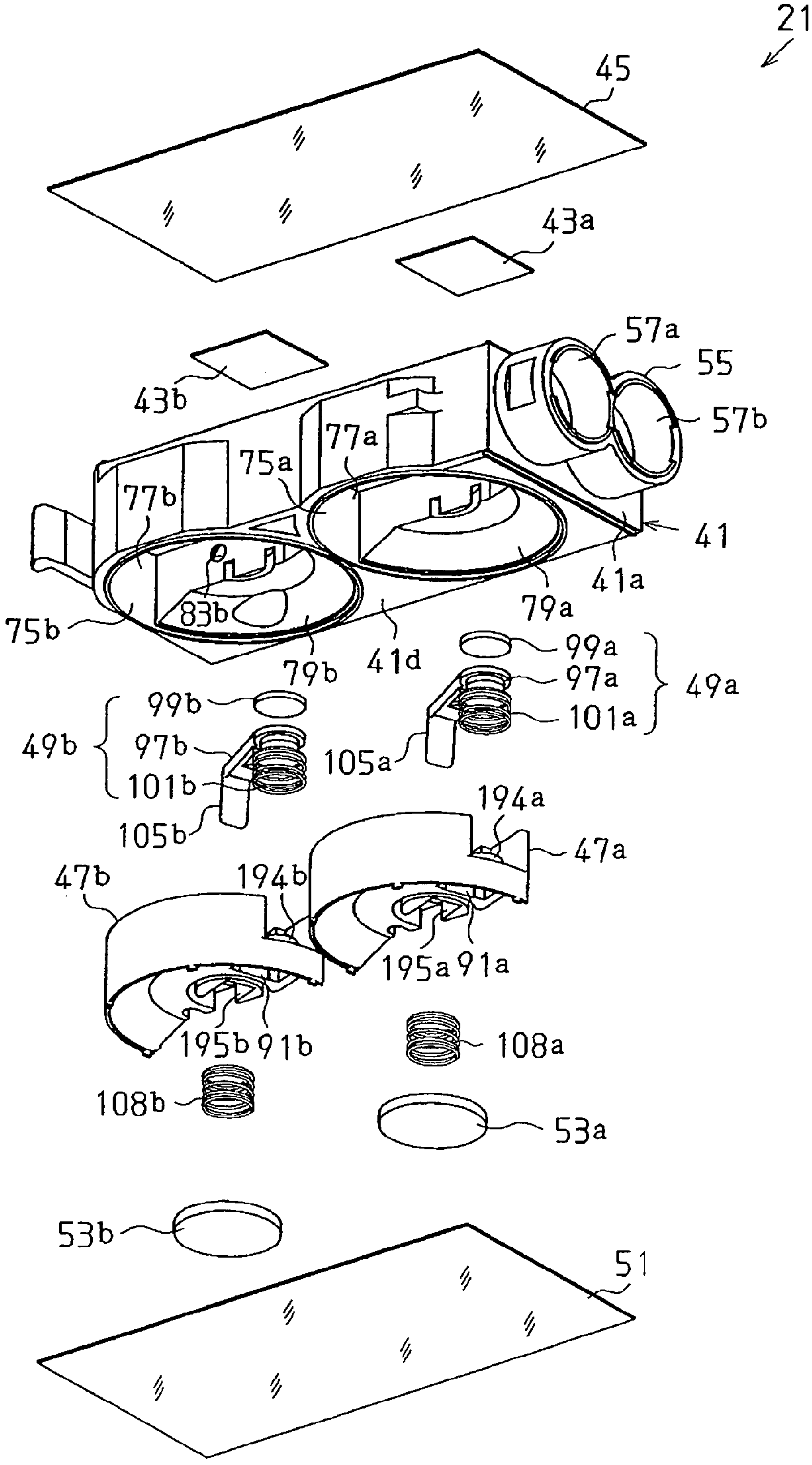
FIG. 8 is an exploded perspective view of the valve unit of FIG. 6.

The unit case 41 is shaped as a roughly rectangular solid, and an ink introducing part 55 is provided on the back surface 41*a* (left side of FIG. 4) of the unit case 41. As shown in FIG. 7 and FIG. 8, the ink introducing part 55 is formed by two connecting cylinders, and includes a first and second ink introducing holes 57*a* and 57*b*. By connecting two of the ink supply tubes 35 (see FIG. 1) on a one-to-one basis to the first and second ink introducing holes 57*a* and 57*b*, ink of a total of two colors can be delivered via two of the ink supply tubes 35 to inside one unit case 41.

Since the unit case 41 is mounted on the driven carriage 15, a light material is required for the unit case 41. In addition, since complicated processing is performed for the unit case 41, the material must also offer excellent workability and mechanical characteristics. Further, since the unit case 41 houses ink, it is also important that the material does not impart a chemical influence on the ink properties, and that the material has a low level of moisture permeability or gas permeability. Therefore, in this embodiment, the unit case 41 is formed by polypropylene, which is excellent in terms of lightweight properties, mechanical characteristics, workability, and chemical resistance,.

Figure 4:
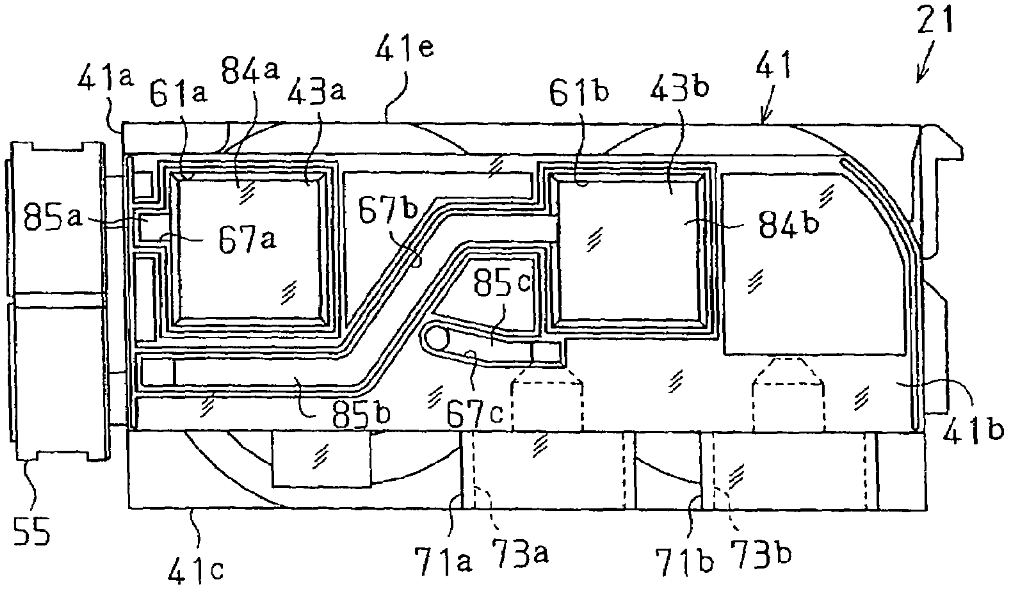
FIG. 4 is a side view of a unit case of a valve unit provided in the recording apparatus of FIG. 1.

As shown in FIG. 4 and FIG. 7, on a first side 41*b* of the unit case 41 are provided a first and second square recess portion 61*a* and 61*b* that respectively define channels of a large cross-sectional area. As shown in FIG. 7, on the bottom of the first and second square recess portions 61*a* and 61*b* are provided a first and second spherical recess portions 63*a* and 63*b* that respectively define channels of a small cross-sectional area. The bottoms of the first and second spherical recess portions 63*a* and 63*b* are formed in a spherical shape. Therefore, roughly circular steps are formed between the first and second square recess portions 61*a* and 61*b* and the first and second spherical recess portions 63*a* and 63*b*. The steps have a first and second step surface 65*a* and 65*b* that are parallel with the first side 41*b*.

Figure 9:
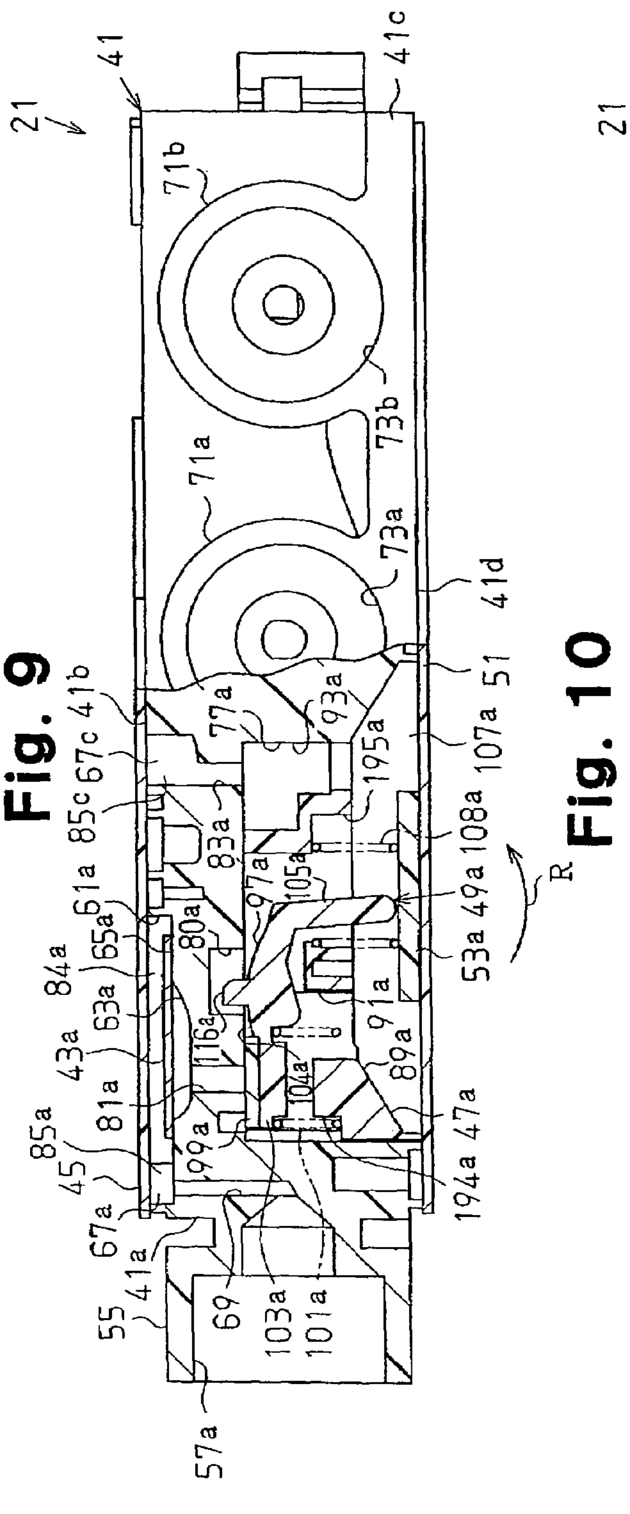
FIG. 9 is a cross-sectional view of main parts of the valve unit of FIG. 6.

As shown in FIG. 4 and FIG. 7, a first conduit 67*a*, a second conduit 67*b* and a third conduit 67*c* are formed on the first side 41*b* of the unit case 41. A first end of the first conduit 67*a* communicates with the first square recess portion 61*a*. As shown in FIG. 9, a second end of the first conduit 67*a* communicates with the first ink introducing hole 57*a* via a communicating hole 69 formed inside the unit case 41.

Further, as shown in FIG. 4 and FIG. 7, a first end of the second conduit 67*b* communicates with the second square recess portion 61*b*. Similarly to the first conduit 67*a*, a second end of the second conduit 67*b* communicates with the second ink introducing hole 57*b* via a communicating hole (not shown) formed inside the unit case 41. The third conduit 67*c* is provided in the vicinity of the second square recess portion 61*b* and the second conduit 67*b*.

As shown in FIG. 4 and FIG. 9, an underside 41*c* of the unit case 41 includes a first and second ink discharging part 71*a* and 71*b*. The first and second ink discharging parts 71*a* and 71*b* are each formed in a cylindrical shape, and include a first and second ink discharging hole 73*a* and 73*b*, respectively. The first ink discharging hole 73*a* communicates with the third conduit 67*c*.

The first and second ink discharging holes 73*a* and 73*b* are respectively connected to the nozzle provided in the recording head 20 (see FIG. 1) for each ink color. Accordingly, for each color, ink discharged from the first and second ink discharging holes 73*a* and 73*b* is guided to the recording head 20 to be ejected from the nozzle.

As shown in FIG. 8, a first and second round recess portion 75*a* and 75*b* are formed on a second side 41*d* of the unit case 41. The first and second round recess portions 75*a* and 75*b* are respectively composed of a first and second fitting recess portion 77*a* and 77*b*, and a first and second not-fitting recess portion 79*a* and 79*b*.

The first and second fitting recess portions 77*a* and 77*b* are formed such that their respective cross sections are semicircular, and the respective bottoms as wall surfaces of the first and second fitting recess portions 77*a* and 77*b* are planar. As shown in FIG. 9, a recess portion 80*a* that is shaped as a roughly rectangular solid is formed on the bottom of the first fitting recess portion 77*a*. A similar recess portion is also formed on the bottom of the second fitting recess portion 77*b*, however graphical representation thereof is omitted herein.

Meanwhile, although the first and second not-fitting recess portions 79*a* and 79*b* are similarly formed such that their respective cross sections are semicircular, the bottoms of the first and second not-fitting recess portions 79*a* and 79*b* are formed to be shallower than the first and second fitting recess portions 77*a* and 77*b*. The bottoms of the first and second not-fitting recess portions 79*a* and 79*b* are roughly spherical.

As shown in FIG. 9, the first fitting recess portion 77*a* communicates with the first spherical recess portion 63*a* via a communicating hole 81*a*. The second fitting recess portion 77*b* also communicates with the second spherical recess portion 63*b* via a communicating hole 81*b* (see FIG. 7).

Further, the first fitting recess portion 77*a* communicates with the third conduit 67*c* via a communicating hole 83*a*. Thus, the first fitting recess portion 77*a* communicates with the first ink discharging hole 73*a* (see FIG. 4) via the third conduit 67*c*. As shown in FIG. 8, a communicating hole 83*b* is provided in the second fitting recess portion 77*b*, and this communicating hole 83*b* communicates with the second ink discharging hole 73*b* (see FIG. 4).

As shown in FIG. 4 and FIG. 7 to FIG. 9, the first and second filter 43*a* and 43*b* are each formed in a thin section having a roughly square shape. The first and second filters 43*a* and 43*b* are respectively installed on the first and second step surfaces 65*a* and 65*b* (see FIG. 7) in a condition where they serve as a partition between the first and second square recess portions 61*a* and 61*b* and the first and second spherical recess portions 63*a* and 63*b*.

The first film member 45 is hot welded to the first side 41*b* of the unit case 41. By means of the first film member 45, openings of the first to third conduits 67*a*, 67*b* and 67*c* and the first and second square recess portions 61*a* and 61*b* are sealed.

Thus, as shown in FIG. 4 and FIG. 9, a first ink introducing chamber 84*a* as an introducing chamber is formed by the first film member 45, and the first square recess portion 61*a* and the first spherical recess portion 63*a* of the unit case 41. In a similar manner, a second ink introducing chamber 84*b* is formed as an introducing chamber by the first film member 45 and the second square recess portion 61*b* and the second spherical recess portion 63*b*. In this embodiment, the pressure pump 25, the first and second filters 43*a* and 43*b*, the first film member 45 and the first and second ink introducing chambers 84*a* and 84*b* constitute a flow controlling mechanism.

Figure 11:
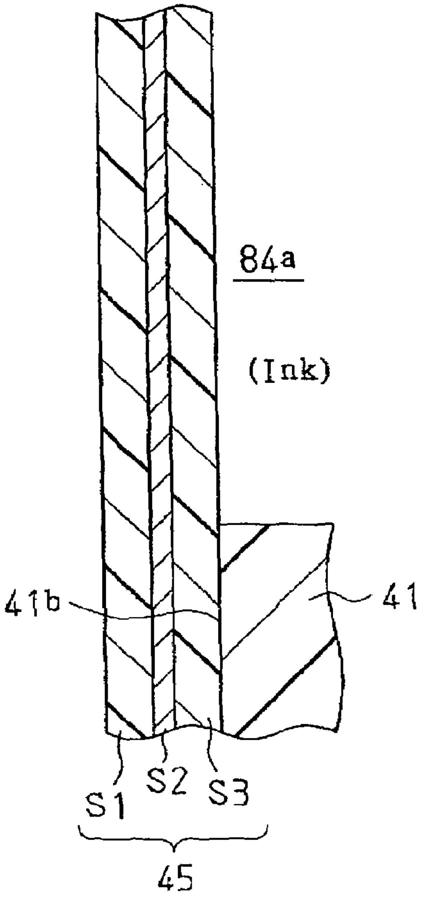
FIG. 11 is a cross-sectional view of a first film member provided in the valve unit of FIG. 6.

It is important that the first film member 45 includes a material that has pressure resistance to withstand pressure imparted to ink stored in the first and second ink introducing chambers 84*a* and 84*b*, and that the material does not impart a chemical influence to the ink properties and has a low level of moisture permeability and gas permeability. Therefore, as shown in FIG. 11, the first film member 45 includes a multi-layered structure, and more specifically includes a three-layer structure having, in order from the outside of the unit case 41 to the inside thereof, a first protective film layer S1, a first intermediate layer S2 and a first inner layer S3.

The first protective film layer S1 is formed of a resin material that is lightweight and that protects the first intermediate layer S2 and the first inner layer S3, and in this embodiment it is formed by polyethylene terephthalate. The thickness of the first protective film layer S1 is 6 microns or more, which is a thickness that can protect the first intermediate layer S2 and the first inner layer S3.

The first intermediate layer S2 is formed of a material that is lightweight and has a low level of moisture permeability and gas permeability, and preferably the material can ensure a stiffness of a certain level or more. For example, while an amorphous alloy facilitates formation of a thin film and ensures gas-shielding properties, in consideration of production cost, preferably aluminum foil, which is a metallic material, is used for the first intermediate layer S2. In particular, the thinner that aluminum foil is formed at the time of aluminum foil formation, the greater the possibility that pinholes will be generated. Therefore, 5 microns or more is employed as the thickness of the first intermediate layer S2, thereby ensuring that the generation of pinholes can be largely eliminated at the time of aluminum foil formation.

Since the first inner layer S3 comes into contact with ink, it is important that the first inner layer S3 does not impart a chemical influence to the ink properties and that it has high adherence with the unit case 41 such that it withstands the ink pressure. To enhance the adhesive properties between the first inner layer S3 and the unit case 41, i.e. to make it difficult for the first inner layer S3 to detach from the unit case 41, the coefficient of thermal expansion of the first inner layer S3 may be the same as the coefficient of thermal expansion of the resin material forming the unit case 41. Thus, the first inner layer S3 is formed from polypropylene, which is the same material as that of the unit case 41. Since it facilitates the conducting of thermocompression bonding, a thickness of 20 microns or more is employed for the first inner layer S3, such that it is not excessively thin. The first film member 45 is formed by thermocompression bonding through an adhesive of the mutually contacting, surfaces of the layers S1, S2, and S3. After previously forming the first film member 45, the first inner layer S3 is aligned with the first side 41*b* of the unit case 41 to conduct thermocompression bonding thereof to the first side 41*b*.

The first film member 45 changes shape due to the difference between the internal and external pressures of the first and second ink introducing chambers 84*a* and 84*b*. More specifically, when the internal pressure of the first and second ink introducing chambers 84*a* and 84*b* decreases below a predetermined pressure, the first film member 45 changes shape in a direction that decreases the volume of the first and second ink introducing chambers 84*a* and 84*b*. As a result, the first film member 45 comes into contact with the first and second filters 43*a* and 43*b* inside the first and second ink introducing chambers 84*a* and 84*b*, thereby enabling the flow of ink passing through the first and second filters 43*a* and 43*b* to be cut off.

Further, as shown in FIG. 4, a first channel 85*a* is defined by the first film member 45 and the first conduit 67*a* of the unit case 41. A second channel 85*b* is defined by the first film member 45 and the second conduit 67*b*. A third channel 85*c* is defined by the first film member 45 and the third conduit 67*c*.

Figure 5:
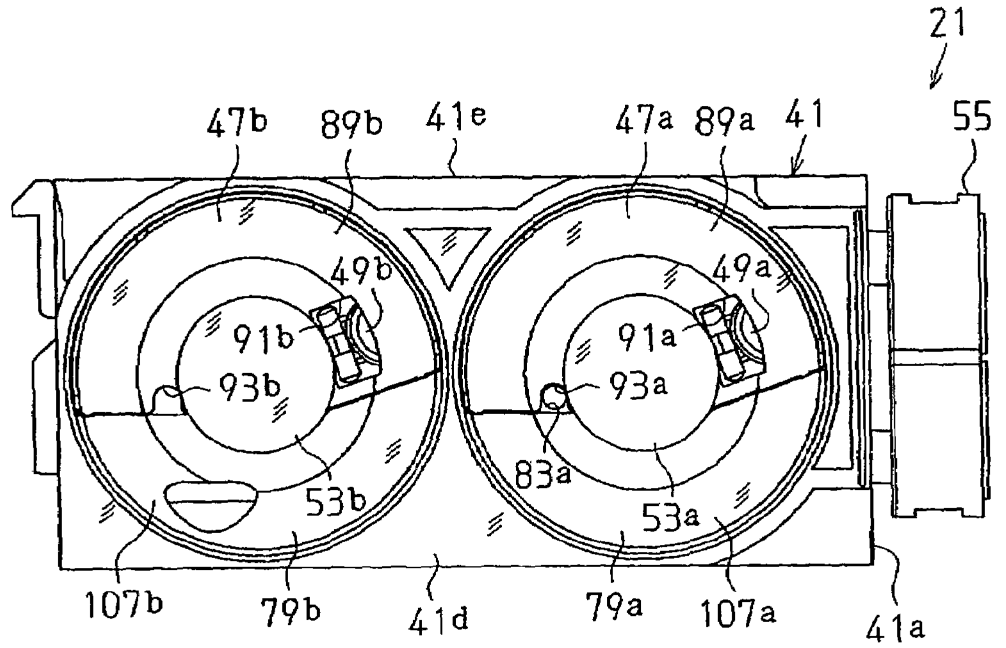
FIG. 5 is a side view of the unit case shown in FIG. 4 when viewed from a different direction.

As shown in FIG. 5 to FIG. 8, the first and second fitting members 47*a* and 47*b* are formed in a roughly semicircular shape, and fit respectively with the first and second fitting recess portions 77*a* and 77*b* of the unit case 41. As shown in FIG. 5 and FIG. 9, a first and second large recess portion 89*a* and 89*b* are defined by the first and second fitting members 47*a* and 47*b* and the first and second not-fitting recess portions 79*a* and 79*b*. The bottoms of the first and second fitting members 47*a* and 47*b* connect with the bottoms of the first and second not-fitting recess portion 79*a* and 79*b* to compose the bottoms of the first and second large recess portions 89*a* and 89*b*.

As shown in FIG. 5 to FIG. 9, in the first and second fitting members 47*a* and 47*b* are respectively provided a first and second ink inflow hole 91*a* and 91*b* that communicate the communicating holes 81*a* and 81*b* formed in the unit case 41 with the first and second large recess portions 89*a* and 89*b*. Further, in the first and second fitting members 47*a* and 47*b* are respectively provided a first and second ink outflow hole 93*a* and 93*b* that communicate the first and second large recess portions 89*a* and 89*b* with the communicating holes 83*a* and 83*b*.

The valve units 21 according to this embodiment are mounted on the carriage 15 (see FIG. 1) such that a top surface 41*e* shown in FIG. 4 is positioned at the uppermost part thereof in the vertical direction. The first and second ink inflow holes 91*a* and 91*b* and the first and second ink outflow holes 93*a* and 93*b* are respectively provided in a position of the first and second fitting members 47*a* and 47*b* to communicate with an almost center part in the vertical direction of the first and second large recess portions 89*a* and 89*b*.

Figure 6:
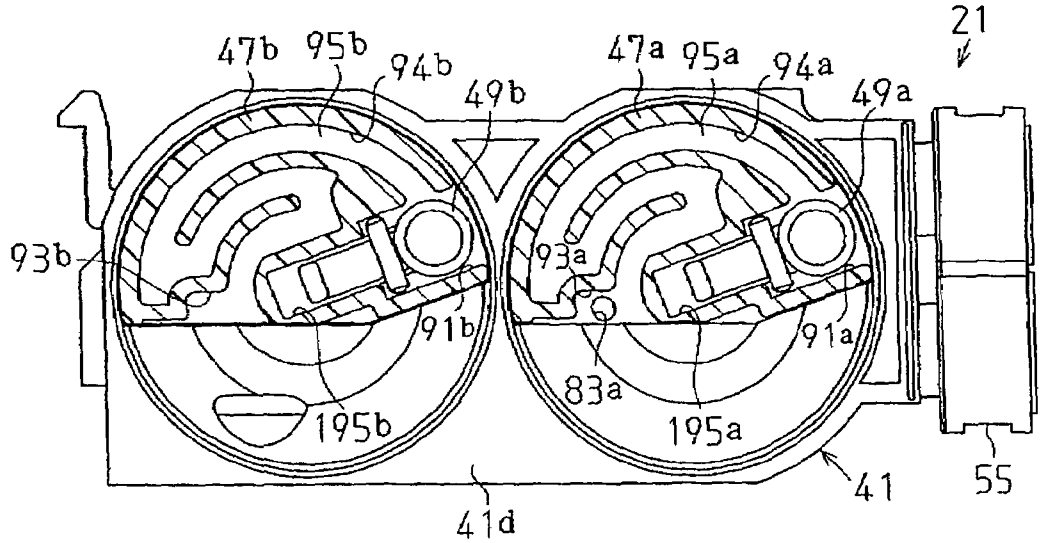
FIG. 6 is a cross-sectional view of main parts of a valve unit provided in the recording apparatus of FIG. 1.

As shown in FIG. 6 and FIG. 7, in the first and second fitting members 47*a* and 47*b* are respectively formed, on the surface on the side of the first film member 45 a first and second S-shaped conduit 94*a* and 94*b*. A first and second S-shaped channels 95*a* and 95*b* are respectively formed by these first and second S-shaped conduits 94*a* and 94*b* and the first and second fitting recess portions 77*a* and 77*b* of the unit case 41. In this embodiment, non-bubble trapping channels are formed by the first and second S-shaped channels 95*a* and 95*b*.

A first end of the first and second S-shaped conduits 94*a* and 94*b* communicates with the first and second ink inflow holes 91*a* and 91*b*, and a second end thereof communicates with the first and second ink outflow holes 93*a* and 93*b*. Accordingly, the first end of the first and second S-shaped channels 95*a* and 95*b* also communicates with the first and second ink inflow holes 91*a* and 91*b*, and the second end thereof communicates with the first and second ink outflow holes 93*a* and 93*b*.

The channel cross-sectional area of the first and second S-shaped channels 95*a* and 95*b* is provided at a size that can secure a flow rate such that bubbles included in ink are not retained in the first and second S-shaped channels 95*a* and 95*b*. More specifically, the channel cross-sectional area of the first and second S-shaped channels 95*a* and 95*b* is provided at a comparatively small cross-sectional area.

As shown in FIG. 6, FIG. 7 and FIG. 9, in the first and second fitting members 47*a* and 47*b* are respectively provided, in a position facing the communicating holes 81*a* and 81*b*, a first and second protruding part 194*a* and 194*b* of a roughly cylindrical shape. Further, as shown in FIG. 6 to FIG. 9, in the center part of the first and second fitting members 47*a* and 47*b* are provided a first and second center hole 195*a* and 195*b* that communicate with the first and second ink inflow holes 91*a* and 91*b*.

As shown in FIG. 7 to FIG. 9, the first and second valve members 49*a* and 49*b* include a first and second valve elements 97*a* and 97*b*, a first and second adhering part 99*a* and 99*b*, and a first and second valve-urging springs 101*a* and 101*b* as urging members. As shown in FIG. 9, the first valve element 97*a* is positioned in a space defined between the bottom of the first fitting recess portion 77*a* and the first fitting member 47*a*. Although not shown in the figure, the second valve element 97*b* is also positioned in the same manner in a space defined between the bottom of the second fitting recess portion 77*b* and the second fitting member 47*b*.

As shown in FIG. 7 to FIG. 9, the first and second valve elements 97*a* and 97*b* respectively include one each of a first and second disc parts 103*a* and 103*b*, a first and second arc-shaped part 104*a* and 104*b* as a fulcrum part, and a first and second power point part 105*a*, 105*b* as a pressure-receiving part integrally. The first and second adhering parts 99*a* and 99*b* and the first and second disc parts 103*a* and 103*b* compose an application point part. The first and second valve elements 97*a* and 97*b* are formed in a roughly L-shape, and at the first ends thereof are provided the first and second power point parts 105*a* and 105*b*, and at the second ends thereof are provided the first and second disc parts 103*a* and 103*b*.

The first and second disc parts 103*a* and 103*b* are formed in a disc shape, and are disposed facing the communicating holes 81*a* and 81*b*. The first and second arc-shaped parts 104*a* and 104*b* are adjacent to the first and second disc parts 103*a* and 103*b*. The surfaces of the first and second arc-shaped parts 104*a* and 104*b* facing the adhering parts 99*a* and 99*b*, i.e. the surfaces facing the bottoms of the first and second fitting recess portions 77*a* and 77*b* are formed in an arc shape. The first and second arc-shaped parts 104*a* and 104*b* respectively include a first and second restriction portion 116*a* and 116*b* that protrude towards the bottom of the first and second fitting recess portions 77*a* and 77*b*.

As shown in FIG. 9, the first restriction portion 116*a* is provided in a state where it fits within the recess portion 80*a* formed on the bottom of the first fitting recess portion 77*a*, in a condition where there is a space between the first restriction portion 116*a* and the recess portion 80*a* that enables movement therebetween. Although not shown in the figure, the second restriction portion 116*b* is likewise provided in a state where it fits within a recess portion formed on the bottom of the second fitting recess portion 77*b*, in a condition where there is a space between the second restriction portion 116*b* and the recess portion that enables movement therebetween.

As shown in FIG. 7 to FIG. 9, the first and second power point parts 105*a* and 105*b* are adjacent to the first and second arc-shaped parts 104*a* and 104*b*, and extend in a direction that is roughly orthogonal with the first and second arc-shaped parts 104*a* and 104*b*. As shown in FIG. 9, the first power point part 105*a* is inserted in the first center hole 195*a* of the first fitting member 47*a* in a condition where it passes therethrough. While not shown in the figure, the second power point part 105*b* is likewise inserted in the second center hole 195*b* of the second fitting member 47*b* in a condition where it passes therethrough. More specifically, the first and second valve elements 97*a* and 97*b* are disposed in a non-fixed condition, without being supported by a shaft or the like, in a space defined between the bottoms of the first and second fitting recess portions 77*a* and 77*b* and the first and second fitting members 47*a* and 47*b*.

As shown in FIG. 7 to FIG. 9, the first and second adhering parts 99*a* and 99*b* are formed in a disc shape by a flexible member, and are fixed such that they are overlaid on the surfaces of the first and second disc parts 103*a* and 103*b* facing the communicating holes 81*a* and 81*b*.

Each of the first ends of the first and second valve-urging springs 101*a* and 101*b* are fitted externally to the first and second protruding parts 194*a* and 194*b* of the first and second fitting members 47*a* and 47*b* to be fixed thereto and each of the second ends thereof is fixed to the first and second disc parts 103*a* and 103*b* of the first and second valve elements 97*a* and 97*b*. More specifically, according to this embodiment, the first and second valve-urging springs 101*a* and 101*b*, the first and second disc parts 103*a* and 103*b*, and the communicating holes 81*a* and 81*b* are substantially provided in alignment with each other. The first and second valve-urging springs 101*a* and 101*b* face the communicating holes 81*a* and 81*b* with the first and second disc parts 103*a* and 103*b* in between.

Thus, in the first and second valve elements 97*a* and 97*b*, the first and second adhering parts 99*a* and 99*b* are urged in a direction approaching the outlets of the communicating holes 81*a* and 81*b* as valve seats by the first and second valve-urging springs 101*a* and 101*b*. As a result, in a state where an external force is not applied to the first and second valve elements 97*a* and 97*b*, the communicating holes 81*a* and 81*b* are blocked by the first and second adhering parts 99*a* and 99*b*.

As shown in FIG. 7 to FIG. 9, the second film member 51 is hot welded to the second side 41*d* of the unit case 41. By means of the second film member 51, openings of the first and second large recess portions 89*a* and 89*b* are sealed. Thus, as shown in FIG. 9, a first and second pressure changing chamber is defined by the second film member 51 and the bottoms of the first and second large recess portions 89*a* and 89*b*. The first and second pressure changing chambers, the first and second ink inflow holes 91*a* and 91*b* and the first and second center holes 195*a* and 195*b* compose the first and second pressure chambers 107*a* and 107*b*.

Figure 12:
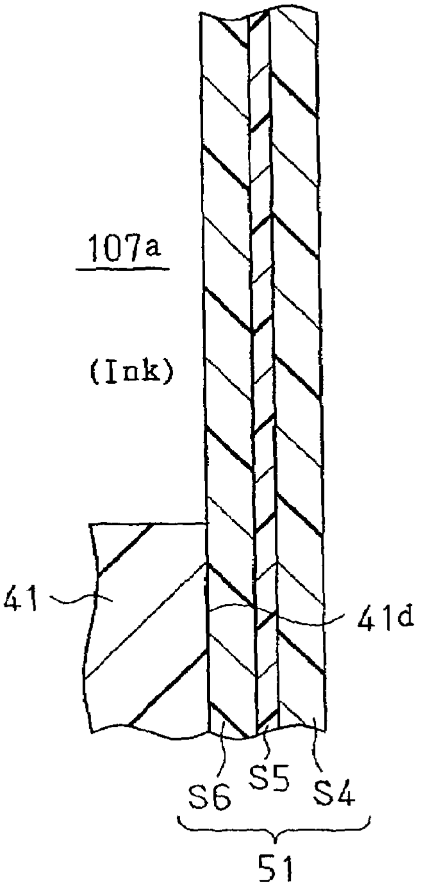
FIG. 12 is a cross-sectional view of a second film member provided in the valve unit of FIG. 6.

It is important that the second film member 51 includes a material that is soft enough to be able to effectively detect a reduced pressure state in the first and second pressure chambers 107*a* and 107*b*, and also does not impart a chemical influence to the ink properties and has a low level of moisture permeability and gas permeability. Therefore, as shown in FIG. 12, the second film member 51 includes a three-layer structure having, in order from the outside of the unit case 41 to the inside thereof, a second protective film layer S4, a second intermediate layer S5 and a second inner layer S6.

The second protective film layer S4 is preferably formed of a lightweight material on which the second intermediate layer S5 can be vapor deposited, and which protects the second intermediate layer S5 and the second inner layer S6. In this embodiment, the second protective film layer S4 is formed by polyethylene terephthalate. The thickness of the second protective film layer S4 is 6 microns or more, which is a thickness that can protect the second intermediate layer S5 and the second inner layer S6.

The second intermediate layer S5 is preferably formed of a material that is lightweight and can be bonded by an adhesive to the second inner layer S6, and that has a low level of moisture permeability and gas permeability. In this embodiment, the second intermediate layer S5 is an alumina-deposition film that is formed on the second protective film layer S4. The thickness of the second intermediate layer S5 is around 500 angstroms.

It is important that the second inner layer S6 includes a material that is soft enough to be able to efficiently detect a reduced pressure state, that does not impart a chemical influence to ink properties, and that has a high level of adhesion to the unit case 41 (difficult to be detached therefrom) such that it withstands pressure applied to ink. Thus, the second inner layer S6 is formed from polypropylene, which is the same material as that of the unit case 41. A thickness of 20 microns or more is employed for the second inner layer S6, since this thickness facilitates detection of pressure changes in the first and second pressure chambers 107*a* and 107*b* and also facilitates the conducting of thermocompression bonding. The second intermediate layer S5 is formed by vapor deposition on the second protective film layer S4, and thereafter the second protective film layer S4 is subject to thermocompression bonding to the second inner layer S6 through an adhesive, to thereby produce the second film member 51. The second film member 51 is fabricated prior to thermocompression bonding thereof to the unit case 41. Thereafter, the second inner layer S6 is aligned with the second side 41*d* of the unit case 41 to conduct thermocompression bonding thereof to the unit case 41.

As shown in FIG. 4 to FIG. 9, in the valve units 21, ink that has entered the first ink introducing hole 57*a* flows into the first pressure chamber 107*a* via the communicating hole 69, first channel 85*a*, first ink introducing chamber 84*a* and communicating hole 81*a*. More specifically, the ink passes through the first ink inflow hole 91*a* and the first center hole 195*a* from the communicating hole 81*a* to flow into the first pressure-changing chamber. Ink that has entered the first pressure chamber 107*a* is fed to the recording head 20 (see FIG. 1) via the first ink outflow hole 93*a*, communicating hole 83*a*, third channel 85*c* and first ink discharging hole 73*a*.

Similarly, ink entering the second ink introducing hole 57*b* from the ink supply tube 35 flows into the second pressure chamber 107*b* via the communicating hole, second channel 85*b*, second ink introducing chamber 84*b* and communicating hole 81*b*. More specifically, the ink passes through the second ink inflow hole 91*b* and the second center hole 195*b* from the communicating hole 81*b* to flow into the second pressure-changing chamber. Ink that has entered the second pressure chamber 107*b* is fed to the recording head 20 via the second ink outflow hole 93*b*, communicating hole 83*b* and second ink discharging hole 73*b*.

In this embodiment, liquid supply channels are formed by the parts of each channel from the first and second ink introducing holes 57*a* and 57*b* to the recording head 20 excluding the first and second pressure chambers 107*a* and 107*b* that include the first and second ink inflow holes 91*a* and 91*b* and first and second center holes 195*a* and 195*b*. More specifically, the liquid supply channels include the communicating hole 69, first and second channels 85*a* and 85*b*, first and second ink introducing chambers 84*a* and 84*b*, communicating holes 81*a* and 81*b*, first and second ink outflow holes 93*a* and 93*b*, communicating holes 83*a* and 83*b*, third channel 85*c*, and first and second ink discharging holes 73*a* and 73*b*.

The second film member 51 changes shape due to the difference between the internal and external pressures of the first and second pressure chambers 107*a* and 107*b*. More specifically, when the internal pressure of the first and second pressure chambers 107*a* and 107*b* decreases below a predetermined pressure, the second film member 51 is deformed in a direction that decreases the volume of the first and second pressure chambers 107*a* and 107*b*.

According to the degree of deformation of the second film member 51, the volumes of the first and second pressure chambers 107*a* and 107*b* vary between a first volume V1 and a second volume V2. The first volume V1 is larger than the second volume V2.

Accompanying a volumetric change in the first and second pressure chambers 107*a* and 107*b*, the channel resistance imparted to ink attempting to pass through the first and second pressure chambers 107*a* and 107*b* also changes. In this embodiment, when the volume in the first and second pressure chambers 107*a* and 107*b* changes from the first volume V1 to the second volume V2, the channel resistance varies between a first channel resistance value K1 and a second channel resistance value K2. The first channel resistance value K1 is a smaller value than the second channel resistance value K2.

In other words, the greater the decrease in the volumes of the first and second pressure chambers 107*a* and 107*b* caused by an increase in the degree of deformation of the second film member 51, the greater the increase in channel resistance.

The first and second S-shaped channels 95*a* and 95*b* are formed such that the size of the channel resistance imparted to ink is a size between the first channel resistance value K1 and the second channel resistance value K2. Therefore, when the degree of deformation of the second film member 51 is small and the volume of the first and second pressure chambers 107*a* and 107*b* is close to the first volume V1, the channel resistance imparted to ink by the first and second pressure chambers 107*a* and 107*b* approaches the first channel resistance value K1 and is less than the channel resistance imparted to ink by the first and second S-shaped channels 95*a* and 95*b*. Accordingly, in this case, ink entering the first and second ink inflow holes 91*a* and 91*b* mainly passes the way of the first and second pressure chambers 107*a* and 107*b* to flow out to the first and second ink outflow holes 93*a* and 93*b*.

Further, when the degree of deformation of the second film member 51 is large and the volume of the first and second pressure chambers 107*a* and 107*b* approaches the second volume V2, the channel resistance imparted to ink by the first and second pressure chambers 107*a* and 107*b* approaches the second channel resistance value K2 and is greater than the channel resistance imparted to ink by the first and second S-shaped channels 95*a* and 95*b*. Accordingly, in this case, ink entering the first and second ink inflow holes 91*a* and 91*b* mainly passes the way of the first and second S-shaped channels 95*a* and 95*b* to flow out to the first and second ink outflow holes 93*a* and 93*b*.

More specifically, the distribution of the ink flow entering the first and second ink inflow holes 91*a* and 91*b* to flow into the first and second pressure chambers 107*a* and 107*b* and the first and second S-shaped channels 95*a* and 95*b* is determined by the degree of deformation of the second film member 51. As the degree of deformation of the second film member 51 increases, the rate of distribution increases for ink flowing to the first and second S-shaped channels 95*a* and 95*b*.

The first and second pressure plates 53*a* and 53*b* are formed in a disc shape, and as shown in FIG. 5 and FIG. 9, they are fixed to the second film member 51 so as to be positioned inside the first and second pressure chambers 107*a* and 107*b*, respectively.

As shown in FIG. 7 to FIG. 9, a first and second pressure bearing spring 108*a* and 108*b* are interposed between the first and second pressure plates 53*a* and 53*b* and the bottoms of first and second large recess portions 89*a* and 89*b*. The first and second pressure bearing springs 108*a* and 108*b* urges the first and second pressure plates 53*a* and 53*b* so as to separate the first and second pressure plates 53*a* and 53*b* from the bottoms of the first and second large recess portions 89*a* and 89*b*. Accordingly, in a state where a force is not applied externally, the first and second pressure plates 53*a* and 53*b* are in a state where they are separated from the bottoms of the first and second large recess portions 89*a* and 89*b*.

The first and second pressure plates 53*a* and 53*b* contact against an end of the first and second power point parts 105*a* and 105*b* of the first and second valve elements 97*a* and 97*b*. When the first and second pressure plates 53*a* and 53*b* move closer to the bottoms of the first and second large recess portions 89*a* and 89*b* in resistance to the urging force of the first and second pressure bearing springs 108*a* and 108*b*, the first and second power point parts 105*a* and 105*b* are subjected to a pushing force.

At that time, the first and second valve elements 97*a* and 97*b* are respectively pressed towards the bottom sides of the first and second fitting recess portions 77*a* and 77*b*, and the first and second arc-shaped parts 104*a* and 104*b* contact against the bottoms of the first and second fitting recess portions 77*a* and 77*b*. Taking the points of contact between the first and second arc-shaped parts 104*a* and 104*b* and the bottoms of the first and second fitting recess portions 77*a* and 77*b* as fulcrums, the first and second valve elements 97*a* and 97*b* are subject to a pushing force rotating in the direction of an arrow R shown in FIG. 9.

Figure 10:
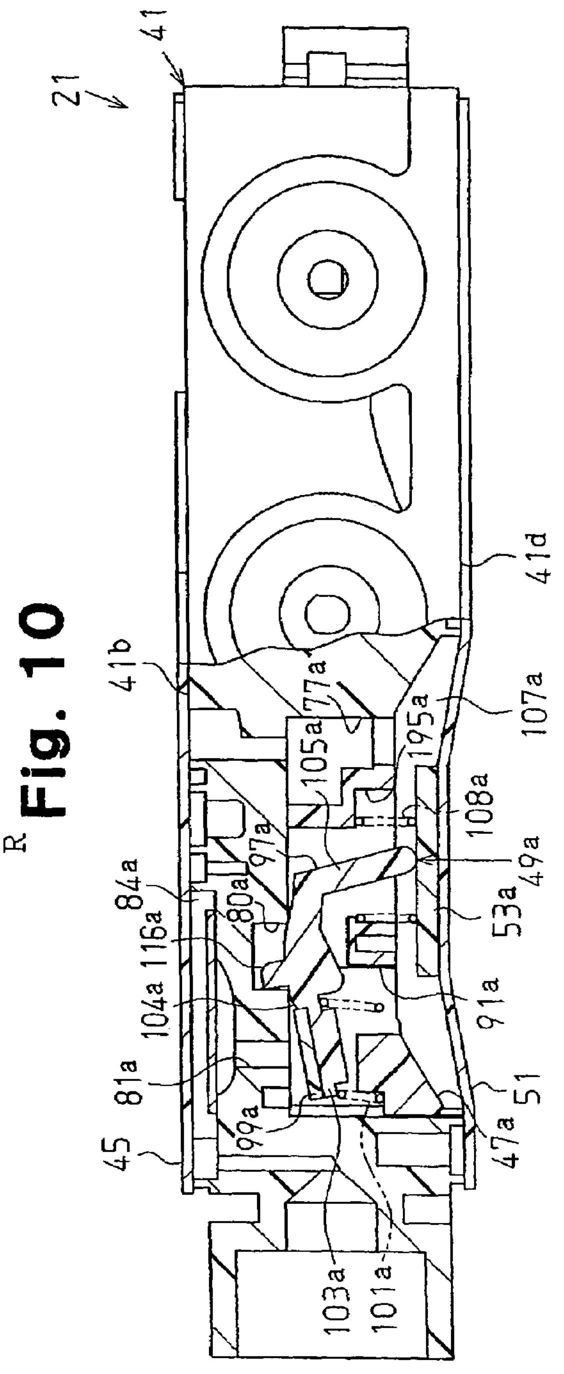
FIG. 10 is a cross-sectional view of main parts that illustrates the operation of the valve unit of FIG. 6.

When this rotating force exceeds the urging force of the first and second valve-urging springs 101*a* and 101*b*, the first and second valve elements 97*a* and 97*b* rotate in the direction of the arrow R shown in FIG. 9. Then, as shown in FIG. 10, the first and second valve elements 97*a* and 97*b* make a rolling movement while gradually shifting the fulcrums, that is, the points of contact between the first and second arc-shaped parts 104*a* and 104*b* and the bottoms of the first and second fitting recess portions 77*a* and 77*b*. More specifically, accompanying rotation of the first and second valve elements 97*a* and 97*b* the sites of contact of the first and second arc-shaped parts 104*a* and 104*b* with respect to the bottoms of the first and second fitting recess portions 77*a* and 77*b* change. Thus, the first and second adhering parts 99*a* and 99*b* that are fixed to the first and second disc parts 103*a* and 103*b* move away from the outlets of the communicating holes 81*a* and 81*b*.

More specifically, when the second film member 51 changes shape due to a decrease in the pressure of the first and second pressure chambers 107*a* and 107*b*, the first and second pressure plates 53*a* and 53*b* move to approach the bottoms of the first and second large recess portions 89*a* and 89*b* in resistance to the urging force of the first and second pressure bearing springs 108*a* and 108*b*. At that time, the first and second valve elements 97*a* and 97*b* are subject to a pushing force and rotate in the direction of the arrow R shown in FIG. 9 while making a rolling movement whereby, as shown in FIG. 10, communication is enabled between the communicating holes 81*a* and 81*b* and the first and second ink inflow holes 91*a* and 91*b*.

In contrast, when the pressure of the first and second pressure chambers 107*a* and 107*b* increases, the first and second pressure plates 53*a* and 53*b* move so as to separate from the bottoms of the first and second large recess portions 89*a* and 89*b*. Thereupon, the first and second valve elements 97*a* and 97*b* rotate in a direction opposite the direction of the arrow R shown in FIG. 9, and the first and second disc parts 103*a* and 103*b* contact the outlets of the communicating holes 81*a* and 81*b*. As a result, as shown in FIG. 9, the communicating holes 81*a* and 81*b* are blocked by the first and second adhering parts 99*a* and 99*b*, whereby communication is disenabled between the communicating holes 81*a* and 81*b* and the first and second ink inflow holes 91*a* and 91*b*.

As shown in FIG. 10, in a state where the first valve element 97*a* allows the communicating hole 81*a* to be in an open state, the first restriction portion 116*a*, which is provided within the recess portion 80*a* on the bottom of the first fitting recess portion 77*a* in a condition where a space exists therebetween that enables movement therebetween, contacts against the wall surface of the recess portion 80*a* to restrict further movement by the first valve element 97*a*. Thus, it is possible to restrict the range of rotation of the first valve element 97*a* so that it is within a given range. Hence, it is possible to prevent the first valve element 97*a* from getting caught on a part within the first fitting recess portion 77*a* or the like. That is, obstruction of the movement of the first valve element 97*a* is prevented, whereby obstruction of opening and closing of the communicating hole 81*a* is also prevented.

Although not shown in the figures, since the movement of the second valve element 97*b* is also restricted in a similar manner to within a predetermined range by the second restriction portion 116*b*, obstruction of opening and closing of the communicating hole 81*b* is prevented.

Figure 14:
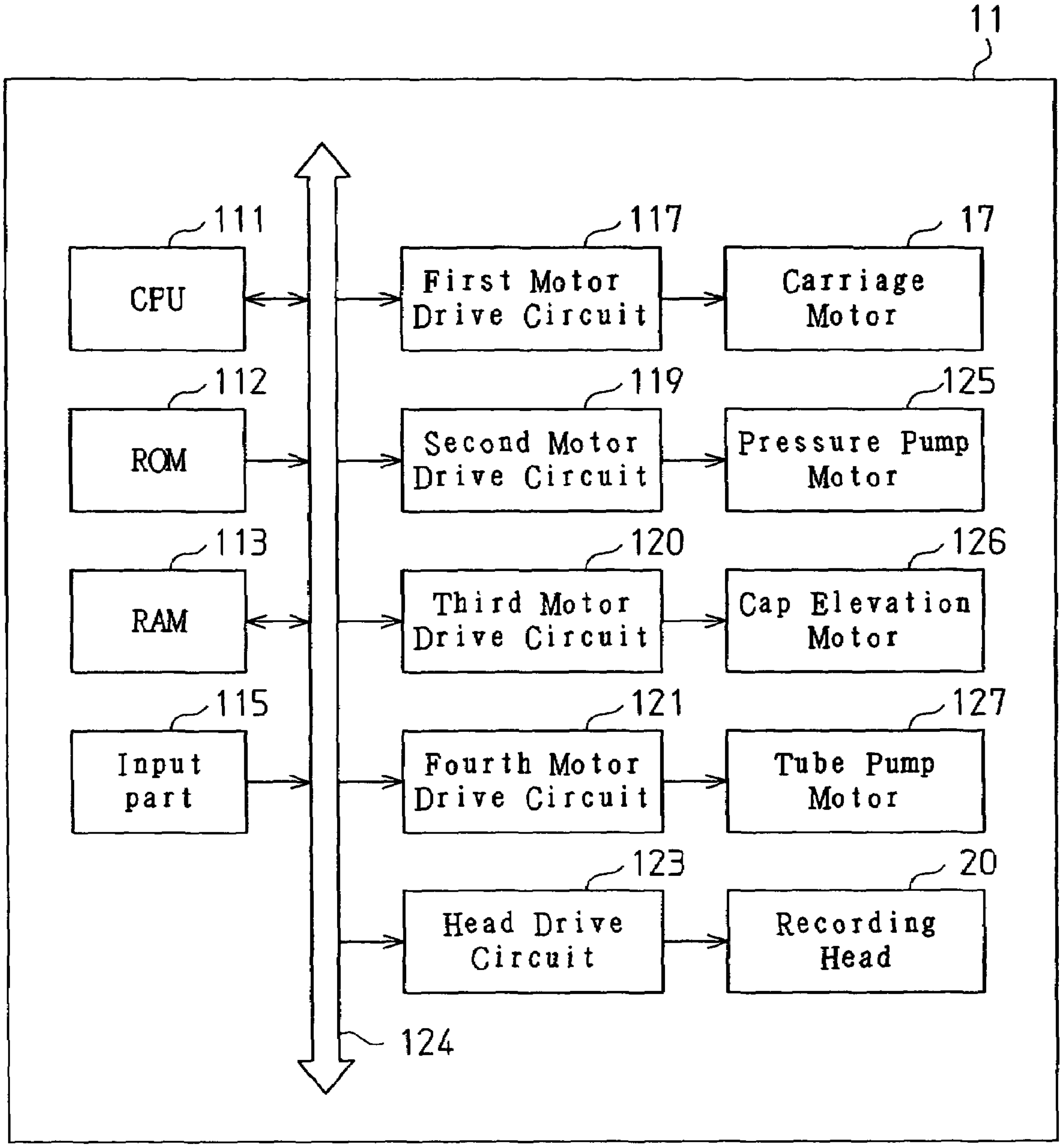
FIG. 14 is an electrical block diagram of the recording apparatus of FIG. 1.

As shown in FIG. 14, the inkjet recording apparatus 11 includes a CPU 111, a ROM 112, and a RAM 113. The inkjet recording apparatus 11 also includes an input part 115. The CPU 111 connects respectively to the carriage motor 17 via a bus 124 and a first motor drive circuit 117, to a pressure pump motor 125 via a second motor drive circuit 119, to a cap elevation motor 126 via a third motor drive circuit 120, to a tube pump motor 127 via a fourth motor drive circuit 121, and to the recording head 20 via a head drive circuit 123. The CPU 111 operates in accordance with various programs stored in the ROM 112, and the processing results thereof and the like are temporarily stored in the RAM. 113. The ROM 112 includes a choke cleaning program and other programs.

Next, the operation of the inkjet recording apparatus 11 configured as described above will be explained.

At the time of normal printing, ink for each color fills the space between the ink pack 32 and the recording head 20. The pressure pump motor 125 is in a state where it is driven by the CPU 111 via the second motor drive circuit 119, and ink inside the ink pack 32 is maintained in a pressurized state by pressurized air introduced into the clearance 33 of the ink cartridges 23 by the pressure pump 25. Accordingly, the state when printing is one where ink is fed in a pressurized state from the ink cartridges 23 to the valve units 21. When the pressure of the first and second pressure chambers 107*a* and 107*b* exceeds a predetermined value the second film member 51 does not change shape, and due to urging force of the first and second valve-urging springs 101*a* and 101*b* the first and second pressure plates 53*a* and 53*b* block off the outlets of the communicating holes 81*a* and 81*b*.

In the valve units 21, ink introduced in a pressurized state from the ink pack 32 is supplied for each color. As shown in FIG. 10, for example, ink fed to the first ink introducing chamber 84*a* via the first ink introducing hole 57*a* is maintained in a state in which it has a high pressure. Accordingly, the first film member 45 of the valve units 21 is maintained in a state in which it does not change shape. As a result, ink fed to the first ink introducing hole 57*a* passes through the first filter 43*a* to be fed to the communicating hole 81*a*.

The pressure of ink fed to the communicating hole 81*a* is applied to the first disc part 103*a* of the first valve element 97*a* through the first adhering part 99*a*. However, since the channel cross-sectional area of the communicating hole 81*a* is extremely small compared to the area of the first disc part 103*a*, pressure that is applied to the first disc part 103*a* by the ink in the communicating hole 81*a* is less than the urging force of the first valve-urging spring 101*a*. Therefore, even when ink is fed in a pressurized state, the first valve element 97*a* of this embodiment does not move in a direction to open the communicating hole 81*a* and the blocked state of the communicating hole 81*a* is maintained.

In this state, when printing based on image data commences, ink is ejected from the recording head 20 and ink inside the first pressure chamber 107*a* of the valve units 21 is fed to the recording head 20 through the first ink discharging hole 73*a* in accordance with the amount of ejected ink. As a result, the ink inside the first pressure chamber 107*a* decreases, thereby decreasing the pressure of the first pressure chamber 107*a*.

When the pressure of ink within the first pressure chamber 107*a* decreases below a predetermined pressure, as shown in FIG. 10, the second film member 51 is deformed in a direction that decreases the volume of the first pressure chamber 107*a*. As a result, the first valve element 97*a* is rotated by the first pressure plate 53*a*, whereby communication is enabled between the communicating hole 81*a* and the first ink inflow hole 91*a*. Then, ink stored in a pressurized state in the first ink introducing chamber 84*a* flows into the first pressure chamber 107*a* to replenish the ink within the first pressure chamber 107*a*.

When ink from the first ink introducing chamber 84*a* flows into the first pressure chamber 107*a*, the ink passes through the first filter 43*a*. The structure of the first filter 43*a* is such that it is difficult for air to pass through the filter, and therefore most bubbles and impurities and the like that are mixed in the ink are trapped in the first ink introducing chamber 84*a*.

When ink flows into the first pressure chamber 107*a*, the pressure of ink inside the first pressure chamber 107*a* rises.

As a result, the deformation of second film member 51 is removed. The first valve element 97*a* then revolves towards its original position, whereby communication is once more disenabled between the communicating hole 81*a* and the first ink inflow hole 91*a*.

More specifically, when ink inside the first pressure chamber 107*a* decreases and the internal pressure falls to or below a predetermined value, communication is enabled between the communicating hole 81*a* and the first ink inflow hole 91*a*, and ink is fed to the first pressure chamber 107*a*. Further, the feeding of ink into the first pressure chamber 107*a* causes the pressure of ink inside the first pressure chamber 107*a* to rise, and when the pressure reaches or exceeds a predetermined value, communication is disenabled between the communicating hole 81*a* and the first ink inflow hole 91*a*, whereby feeding of ink to the first pressure chamber 107*a* is stopped.

As a result, when printing, ink that has been regulated to have a pressure value within a predetermined range is stored in the first pressure chamber 107*a*, thereby ensuring the stability of the ink supply to the recording head 20.

Similarly to the ink fed to the first ink introducing chamber 84*a*, the ink fed to the second ink introducing chamber 84*b* through the second ink introducing hole 57*b* is stored in the second pressure chamber 107*b* at a pressure that has been regulated to be within a predetermined range, and fed to the recording head 20 in a stable state.

Next, the operation of the inkjet recording apparatus 11 at a time of choke cleaning will be described. When the input part 115 (see FIG. 14) is operated by a user to input an ON signal to the CPU 111, the CPU 111 first drives the carriage motor 17 in accordance with the choke cleaning program to move the carriage 15 to home position.

The CPU 111 switches to a pressure reduction stage, and stops driving the pressure pump motor 125 so that pressurized air is not sent from the pressure pump 25. Thereby, ink is fed in a non-pressurized state from the ink cartridges 23 to the valve units 21. Subsequently, the CPU 111 switches to a capping stage, and drives the cap elevation motor 126 to raise the cap 26*a* to seal the nozzle forming face of the recording head 20. After raising the cap 26*a*, the CPU 111 switches to a suction stage, and drives the tube pump motor 127 to generate a vacuum inside the cap 26*a*.

As a result, ink is drawn through the recording head 20, and the amount of ink in the first and second pressure chambers 107*a* and 107*b* of the valve units 21 begins to decrease. FIG. 10 shows a state where the ink in the first pressure chamber 107*a* has decreased. Since the state for the second pressure chamber 107*b* is the same as the first pressure chamber 107*a*, a diagrammatic representation thereof has been omitted. As shown in FIG. 10, when the pressure inside the first and second pressure chambers 107*a* and 107*b* decreases to or below a predetermined pressure, similarly to the aforementioned printing time, the second film member 51 and the first and second valve elements 97*a* and 97*b* and the like act to enable communication between the communicating holes 81*a* and 81*b* and the first and second ink inflow holes 91*a* and 91*b*.

As a result, ink inside the first and second ink introducing chambers 84*a* and 84*b* flows into the first and second pressure chambers 107*a* and 107*b*. However, at the time of choke cleaning, as described above, ink is fed from the ink cartridges 23 in a non-pressurized state into the first and second ink introducing chambers 84*a* and 84*b*. Since communication is possible between the communicating holes 81*a* and 81*b* and the first and second ink inflow holes 91*a* and 91*b*, the internal pressure of the first and second ink introducing chambers 84*a* and 84*b* also starts to decrease.

Figure 17:
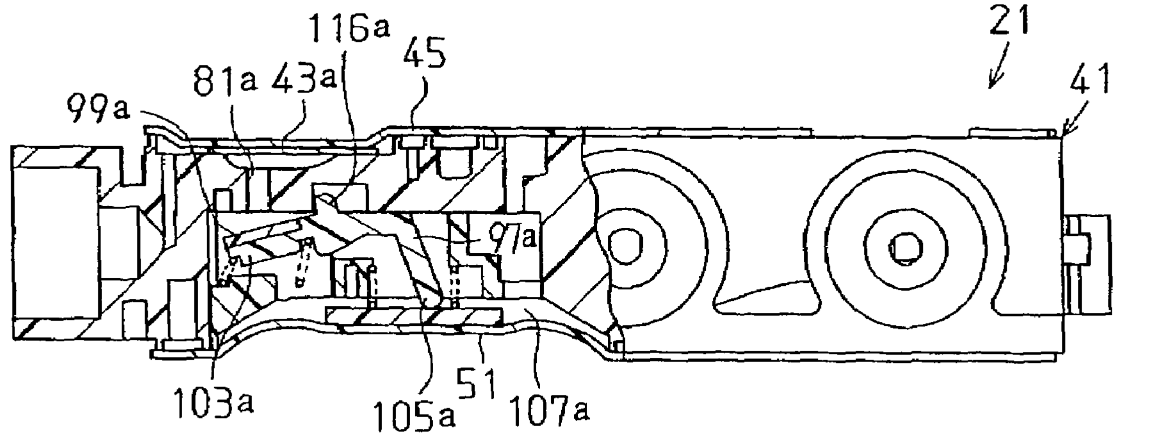
FIG. 17 is a cross-sectional view of a principal part showing the operation of the valve unit of FIG. 15.

When the pressure inside the first and second ink introducing chambers 84*a* and 84*b* decreases below a predetermined pressure, the first film member 45 changes shape, and the first film member 45 and the first and second filters 43*a* and 43*b* come into contact (see FIG. 17). Thus, the first film member 45 blocks the flow of ink passing through the first and second filters 43*a* and 43*b*.

Next, the CPU 111 changes to a suction stage and a flow amount switching stage, whereby the drawing operation of the tube pump 26*e* is continued. As a result, reduced pressure is accumulated in the downstream side, taking the first and second ink introducing chambers 84*a* and 84*b* as a boundary. When the degree of deformation of the second film member 51 becomes large, the volume of the first and second pressure chambers 107*a* and 107*b* decreases to approach the second volume V2. Then, the channel resistance inside the first and second pressure chambers 107*a* and 107*b* approaches the second channel resistance value K2 and becomes larger than the channel resistance of the first and second S-shaped channels 95*a* and 95*b*. As a result, ink flowing into the first and second ink inflow holes 91*a* and 91*b* flows mainly towards the first and second S-shaped channels 95*a* and 95*b*.

Figure 13:
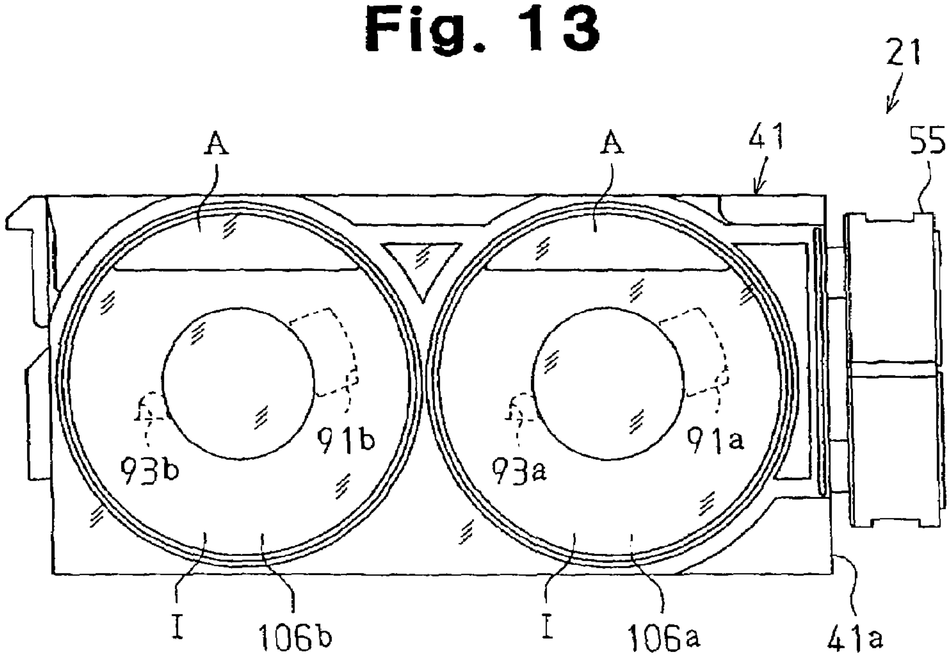
FIG. 13 is a side view showing the operation of the valve unit of FIG. 6.

When printing, trapped bubbles A (see FIG. 13) are retained inside the first and second pressure chambers 107*a* and 107*b*. However, since the degree of deformation of the second film member 51 becomes large due to continuation of the drawing action of the tube pump 26*e*, there is no longer space for the bubbles A within the first and second pressure chambers 107*a* and 107*b*. Thus, the bubbles A move to the first and second S-shaped channels 95*a* and 95*b* through the first and second ink inflow holes 91*a* and 91*b*.

As described above, since the channel cross-sectional area of the first and second S-shaped channels 95*a* and 95*b* is comparatively small, ink flows through the first and second S-shaped channels 95*a* and 95*b* at a comparatively high flow rate. Accordingly, the bubbles A that were carried into the first and second S-shaped channels 95*a* and 95*b* are led to the first and second ink outflow holes 93*a* and 93*b* without being retained in the first and second S-shaped channels 95*a* and 95*b*.

Thus, bubbles A that were trapped inside the first and second pressure chambers 107*a* and 107*b* are moved to the recording head 20 via the first and second S-shaped channels 95*a* and 95*b* to be discharged to the cap 26*a* via the nozzle of the recording head 20.

In accordance with the choke cleaning program, the CPU 111 times the driving time of the tube pump motor 127 and when a predetermined time has lapsed the CPU 111 shifts to a pressure increase stage and starts driving the pressure pump motor 125. When the CPU 111 starts the driving of the pressure pump motor 125, it concludes the processing of the choke cleaning program.

As a result, sending of pressurized air from the pressure pump 25 starts, and ink is fed in a pressurized state from the ink cartridges 23 to the valve units 21. Then, ink is fed to the first and second ink introducing chambers 84*a* and 84*b* of the valve units 21 and deformation of the first film member 45 is eliminated. Thus, the first film member 45 moves away from the first and second filters 43*a* and 43*b* to allow the flow of ink through the first and second filters 43*a* and 43*b*.

Ink from the upstream side then flows abruptly in one go into the region downstream from the first and second ink introducing chambers 84*a* and 84*b*, such that ink of an momentarily elevated flow rate flows therein to remove the accumulated reduced pressure. Thus, bubbles and impurities and the like that were retained downstream from the first and second ink introducing chambers 84a and 84b are discharged together with the ink in one go from the nozzle of the recording head 20. In this manner, “choke cleaning” can be performed. As a result, ink is favorably filled in the ink distribution channels of the inkjet recording apparatus 11.

The Above Embodiment has the Following Advantages (1) The first and second valve elements 97a and 97b are urged by the first and second valve-urging springs 101a and 101b in a direction such that the first and second adhering parts 99a and 99b approach the outlets of the communicating holes 81a and 81b. At this time, the first and second valve-urging springs 101a and 101b are provided in a position facing the outlets of the communicating holes 81a and 81b with the first and second disc parts 103a and 103b on which the first and second adhering parts 99a and 99b are fixed in between. Therefore, the first and second valve-urging springs 101a and 101b, the first and second adhering parts 99a and 99b, the first and second disc parts 103a and 103b and the outlets of the communicating holes 81a and 81b are disposed in alignment with each other.

As a result, the direction in which the first and second disc parts 103a and 103b are urged by the first and second valve-urging springs 101a and 101b matches the direction in which the first and second disc parts 103a and 103b approach the outlets of the communicating holes 81a and 81b, whereby blocking of the communicating holes 81a and 81b by the first and second valve elements 97a and 97b is conducted more securely. Thus, in the valve units 21, the area between the communicating holes 81a and 81b and the first and second ink inflow holes 91a and 91b is blocked off more reliably. Namely, it is possible to stop the supply of ink. Accordingly, the supply of ink to the recording head 20 of the inkjet recording apparatus 11 is conducted more stably.

(2) In spaces formed between the bottoms of the first and second fitting recess portions 77a and 77b and the first and second fitting members 47a and 47b, the first and second valve elements 97a and 97b rotate in a non-fixed condition with respect to the wall surfaces compartmentalizing the first and second fitting recess portions 77a and 77b, that is, the sides and bottoms of the first and second fitting recess portions 77a and 77b, whereby the communicating holes 81a and 81b are opened or blocked.

Accordingly, it is possible for play to exist in the movement of the first and second valve elements 97a and 97b. As a result, regardless of manufacturing errors, an appropriate positional relationship between the first and second valve elements 97a and 97b and the outlets of the communicating holes 81a and 81b is maintained due to the play of the first and second valve elements 97a and 97b. Therefore, even if the accuracy of finishing of the first and second valve elements 97a and 97b or the communicating holes 81a and 81b or the like is low, adherence between the first and second valve elements 97a and 97b and the outlets of the communicating holes 81a and 81b is enhanced. As a result, the space between the communicating holes 81a and 81b and the first and second ink inflow holes 91a and 91b and the like is cut-off more securely, making it possible to enhance the reliability of stable supply of ink to the recording head 20.

For example, in a case where the first and second valve elements 97a and 97b are supported in a condition where they can rotate around shafts fixed to the bottoms or sides of the first and second fitting recess portions 77a and 77b, there is a possibility that an energy loss will be generated by friction or the like occurring between the shafts and the first and second valve elements 97a and 97b. However, in this embodiment, since the first and second valve elements 97a and 97b are not supported by shafts, the likelihood of an energy loss arising is reduced.

(3) The first and second valve elements 97a and 97b include first and second disc parts 103a and 103b, first and second arc-shaped parts 104a and 104b and first and second power point parts 105a and 105b. The first and second arc-shaped parts 104a and 104b contact to the bottoms of the first and second fitting recess portions 77a and 77b while rolling in a state where they are not fixed thereto, to support and rotate the first and second valve elements 97a and 97b. Thus, play is allowed in the movement of the first and second valve elements 97a and 97b using a simple structure.

(4) The first and second valve elements 97a and 97b are positioned in a space defined between the bottoms of the first and second fitting recess portions 77a and 77b and the first and second fitting members 47a and 47b. Therefore, even if ink is fed from the ink cartridges 23 to the valve units 21 at a high pressure, the first and second valve elements 97a and 97b are formed to receive the influence of the pressure of the ink through only the communicating holes 81a and 81b, and thus the influence thereof is small. Thus, it is possible to carry out ink supply in which the influence of the ink pressure does not substantially affect the valve units 21. It is thus possible to perform more stable supply of ink to the recording head 20 from the valve units 21.

(5) When the first and second valve elements 97a and 97b have moved away from the outlets of the communicating holes 81a and 81b, a further movement by the first and second valve elements 97a and 97b is restricted by the first and second restriction portions 116a and 116b. Accordingly, when the first and second valve elements 97a and 97b are rotating to move away from the outlets of the communicating holes 81a and 81b, they do not move to an excessively large extent. Hence, it is possible to prevent the first and second valve elements 97a and 97b from catching or the like inside the first and second fitting recess portions 77a and 77b. As a result, the movement of the first and second valve elements 97a and 97b is corrected, enabling the performance of the valve units to be maintained.

(6) The first film member 45 has a three-layer structure including the first protective film layer S1, the first intermediate layer S2 and the first inner layer S3 in that order from the outside. The first and second ink introducing chambers 84a and 84b are defined by thermocompression bonding of the first film member 45 to the first side 41b of the unit case 41. The first inner layer S3 of the first film member 45 directly bonded (by thermocompression bonding) with the first side 41b is formed of polypropylene, the same material as the unit case 41.

Thus, since the first inner layer S3 and the unit case 41 are formed of the same material, the coefficient of thermal expansion of both is the same. Therefore, since the first inner layer S3 and the unit case 41 expand and contract at the same coefficient of thermal expansion when the first inner layer S3 is undergoing thermocompression bonding to the unit case 41, the application of an excessive stress to one of the two members after thermocompression bonding is inhibited. Accordingly, the first film member 45 is extremely resistant to peeling from the first side 41b of the unit case 41. Since the first film member 45 is fabricated with the same material as the unit case 41, the material is readily obtained, enabling the production cost to be reduced.

The first intermediate layer S2 of the first film member 45 is formed of aluminum foil, which provides zero gas permeability and zero moisture permeability. Thus, moisture vaporization and the like of ink fed to the first and second ink introducing chambers 84*a* and 84*b* is suppressed, enabling the suppression of variations in the viscosity or properties and the like of the ink.

The first protective film layer S1 of the first film member 45 is formed of polyethylene terephthalate. Consequently, concerns regarding damage to the first intermediate layer S2 or the first inner layer S3 are reduced.

(7) The second film member 51 has a three-layer structure including the second protective film layer S4, the second intermediate layer S5 and the second inner layer S6 that are superposed in that order from the outside. The first and second pressure chambers 107*a* and 107*b* are defined by bonding the second film member 51 to the second side 41*d* of the unit case 41 by thermocompression bonding. The second inner layer S6 that is directly bonded (by thermocompression bonding) to the second side 41*d* of the unit case 41 is formed of polypropylene, which is the same material as the unit case 41.

Accordingly, since the second inner layer S6 and the unit case 41 are formed of the same material, the coefficient of thermal expansion of both is the same. Therefore, since the second inner layer S6 and the unit case 41 expand and contract at the same coefficient of thermal expansion when the second inner layer S6 is undergoing thermocompression bonding to the unit case 41, the application of an excessive stress to one of the two members after thermocompression bonding is inhibited. Thus, the second film member 51 is extremely resistant to peeling from the second side 41*d* of the unit case 41. Since the second film member 51 is fabricated with the same material as the unit case 41, the material is readily obtained, enabling the production cost to be reduced.

The second intermediate layer S5 of the second film member 51 is formed of alumina-deposition film. Accordingly, the second inner layer S6 formed of the aforementioned polypropylene, a soft material, can easily change shape due to even a small vacuum. Further, since alumina-deposition film has a low level of gas permeability and moisture permeability, moisture vaporization and the like of ink fed to the first and second pressure chambers 107*a* and 107*b* is suppressed, enabling the suppression of variations in the viscosity and properties and the like of the ink.

(8) Polypropylene is used for the unit case 41, first film member 45 and second film member 51. Polypropylene is not harmful to the environment, as it does not generate toxic gases such as chlorine gas or dioxin when subject to combustion.

(9) When defining the first and second ink introducing chambers 84*a* and 84*b* and the first and second pressure chambers 107*a* and 107*b* on the unit case 41, the first film member 45 and the second film member 51 are respectively adhered to the unit case 41 by thermocompression bonding. Therefore, in comparison to a structure that defines the first and second ink introducing chambers 84*a* and 84*b* and the first and second pressure chambers 107*a* and 107*b* by mechanically sealing the chambers, the airtightness thereof is enhanced by a simple structure.

(10) The inkjet recording apparatus 11 is an air-pressure system apparatus that pumps ink towards the recording head 20 by introducing pressurized air from the pressure pump 25 into the ink cartridges 23. The first and second ink introducing chambers 84*a* and 84*b* are provided in the valve units 21 part way along the ink channels between the ink cartridges 23 and the recording head 20. One part of the wall surfaces of the first and second ink introducing chambers 84*a* and 84*b* is defined by the first film member 45 that changes shapes in accordance with a difference between the internal ink pressure and atmospheric pressure. Therefore, the above-described choke cleaning is conducted. As a result, ink is favorably filled in the ink distribution channels of the inkjet recording apparatus 11.

In this embodiment, the choke cleaning is implemented by the driving of the pressure pump 25 that is normally provided in a pressure-supply apparatus, and not by a choke valve that opens and closes using an actuator or the like. Therefore, choke cleaning is conducted by a simple control, without having to increase the size of the apparatus by newly providing a choke valve or the like.

(11) The first and second ink introducing chambers 84*a* and 84*b* include the first and second square recess portions 61*a* and 61*b* and the first and second spherical recess portions 63*a* and 63*b*. The first film member 45 faces the first and second step surfaces 65*a* and 65*b* that are between the first and second square recess portions 61*a* and 61*b* and the first and second spherical recess portions 63*a* and 63*b*. When the pressure of the first and second ink introducing chambers 84*a* and 84*b* decreases, the first film member 45 changes shape and contacts the first and second step surfaces 65*a* and 65*b*. Thus, it is possible to improve the responsiveness of changes in channel resistance to changes in the pressure inside the first and second ink introducing chambers 84*a* and 84*b*, to enable choke cleaning to be performed more reliably.

(12) The first and second step surfaces 65*a* and 65*b* are positioned downstream than the first film member 45. When conducting choke cleaning, a suction force towards the downstream side is applied by the tube pump 26*e* to the first film member 45. Therefore, in comparison with a case of positioning the first film member 45 downstream than the first and second step surfaces 65*a* and 65*b*, it is possible for the first film member 45 to more reliably approach the first and second step surfaces 65*a* and 65*b*. As a result, choke cleaning is performed with greater reliability.

(13) The first and second ink introducing chambers 84*a* and 84*b* are integrated into the valve units 21 including the first and second valve members 49*a* and 49*b* and the first and second pressure chambers 107*a* and 107*b*. Therefore, each valve unit 21 can include both a function that ensures the stability of ink supply to the recording head 20 when printing and a function for reliably carrying out choke cleaning. Thus, the configuration of the inkjet recording apparatus 11 is simplified.

(14) The first and second filters 43*a* and 43*b* are provided on the first and second step surfaces 65*a* and 65*b* of the first and second ink introducing chambers 84*a* and 84*b*. Therefore, bubbles, impurities and the like that are contained in ink fed from the ink cartridges 23 to the recording head 20 are trapped by the first and second filters 43*a* and 43*b*. Thus, the amount of bubbles and impurities ejected from a nozzle when ejecting ink onto a recording medium from the recording head 20 is reduced. This enables the performance of high quality printing.

Since the first film member 45 changes shape in a direction to approach the first and second filters 43*a* and 43*b* when conducting choke cleaning, bubbles and impurities trapped in the first and second filters 43*a* and 43*b* are subject to a pressing force, whereby they are passed through the first and second filters 43*a* and 43*b*. Thus, at the time of choke cleaning, trapped bubbles and impurities and the like are discharged with greater reliability, and ink fills the ink distribution channels between the ink cartridges 23 and the recording head 20 in a more favorable manner.

(15) Ink that has flowed into the first and second ink introducing holes 57*a* and 57*b* of the valve units 21 passes through at least one of either the first and second S-shaped channels 95*a* and 95*b*, in which bubbles are not liable to be trapped, or the first and second pressure chambers 107*a* and 107*b*, in which bubbles are liable to be trapped, to be fed to the recording head 20. The distribution of the quantity of ink flowing into the first and second pressure chambers 107*a* and 107*b* and the first and second S-shaped channels 95*a* and 95*b* changes according to the degree of deformation of the second film member 51.

Therefore, by regulating the amount of deformation of the second film member 51, ink is made to flow mainly into the first and second pressure chambers 107*a* and 107*b* when printing, thereby increasing the probability that bubbles in the ink are trapped. Thus, it is possible to prevent a decline in printing performance due to bubbles being discharged with ink from the recording head 20. When the trapped bubbles have grown to a maximum limit, ink is made to flow mainly into the first and second S-shaped channels 95*a* and 95*b* by changing the amount of deformation of the second film member 51. Thus, air trapped inside the first and second pressure chambers 107*a* and 107*b* is guided to the first and second S-shaped channels 95*a* and 95*b* and discharged from the recording head 20. As a result, removal of bubbles retained in the first and second pressure chambers 107*a* and 107*b* is conducted with more reliability to restore the ability of the apparatus to trap bubbles.

(16) In the valve units 21, the first and second ink inflow holes 91*a* and 91*b* and the first and second ink outflow holes 93*a* and 93*b* are provided in an almost central part in the vertical direction of the first and second pressure chambers 107*a* and 107*b*. Thus, bubbles are trapped using a simple structure. Since it is not necessary to provide an elaborate device or the like to trap bubbles, the overall structure of the inkjet recording apparatus 11 is simplified.

(17) As the amount of deformation of the second film member 51 is increased, the volume of the first and second pressure chambers 107*a* and 107*b* decreases in accordance therewith to increase the channel resistance inside the first and second pressure chambers 107*a* and 107*b*, whereby the flow volume of ink flowing into the first and second S-shaped channels 95*a* and 95*b* increases. Thus, when bubbles trapped in the first and second pressure chambers 107*a* and 107*b* have grown, the flow volume of ink flowing through the first and second S-shaped channels 95*a* and 95*b* is increased by producing a large deformation in the second film member 51. At this time, since the volume of the first and second pressure chambers 107*a* and 107*b* decreases in accordance with the degree of deformation of the second film member 51, there is no longer space for the bubbles inside the first and second pressure chambers 107*a* and 107*b*. Thus, when the flow volume of the first and second S-shaped channels 95*a* and 95*b* has increased, the bubbles are guided with more reliability to the first and second S-shaped channels 95*a* and 95*b*, enabling the bubbles trapped inside the first and second pressure chambers 107*a* and 107*b* to be removed with more reliability.

(18) By the driving of the pressure pump 25 and the capping apparatus 26, a difference occurs in the internal and external pressures of the first and second pressure chambers 107*a* and 107*b*, resulting in deformation of the second film member 51. More specifically, since an actuator or the like that directly deforms the second film member 51 is not provided, a driving mechanism for changing the shape of the second film member 51 is provided at a position that is away from the second film member 51. Thus, it is possible to enhance the degree of flexibility in designing the inkjet recording apparatus 11.

The pressure pump 25 and capping apparatus 26 are devices that are originally included by the inkjet recording apparatus 11, and they are also used as devices for generating a pressure difference between the internal and external pressures of the first and second pressure chambers 107*a* and 107*b* to perform choke cleaning. Thus the configuration of the apparatus is simplified.

(19) The first and second pressure chambers 107*a* and 107*b* that are provided for stabilizing the supply of ink to the recording head 20 are also used as fluid retention chambers that trap bubbles. Thus, the configuration of the inkjet recording apparatus 11 is simplified.

(20) The first and second channels 95*a* and 95*b* are formed in an S shape. Thus, while maintaining an overall compact condition, the channel length of the first and second channels 95*a* and 95*b* is made comparatively long. As a result, the channel resistance of the first and second S-shaped channels 95*a* and 95*b* is made comparatively large, facilitating the formation of a structure in which ink is not liable to enter the channels when printing.

The present invention may be modified as described hereunder.

In the valve units 21 of the above embodiment, the second film member 51 is deformed by the generation of a vacuum accompanying a decrease in the amount of ink in the first and second pressure chambers 107*a* and 107*b*, whereby the first and second valve elements 97*a* and 97*b* are subjected to a pressing force and revolved. However, the valve units 21 are not limited thereto, and may embody a different configuration as long as the configuration can detect a vacuum accompanying a decrease in the amount of ink in the first and second pressure chambers 107*a* and 107*b* to rotate the first and second valve elements 97*a* and 97*b*.

In the above embodiment, the first and second valve elements 97*a* and 97*b* are L-shaped and include the first and second disc parts 103*a* and 103*b*, first and second arc-shaped parts 104*a* and 104*b* and first and second power point parts 105*a* and 105*b*. However, the first and second valve elements 97*a* and 97*b* are not limited thereto, and may be modified to have a different shape as long as they are urged by the first and second valve-urging springs 101*a* and 101*b* and move away from the communicating holes 81*a* and 81*b* as the result of a decrease in the pressure of ink in the first and second pressure chambers 107*a* and 107*b*.

In the above embodiment, the first and second arc-shaped parts 104*a* and 104*b* function as a fulcrum part of the first and second valve elements 97*a* and 97*b*. However, the fulcrum part is not limited thereto, and may embody a different form as long as the part can rotate the first and second valve elements 97*a* and 97*b* while rolling.

Figure 15:
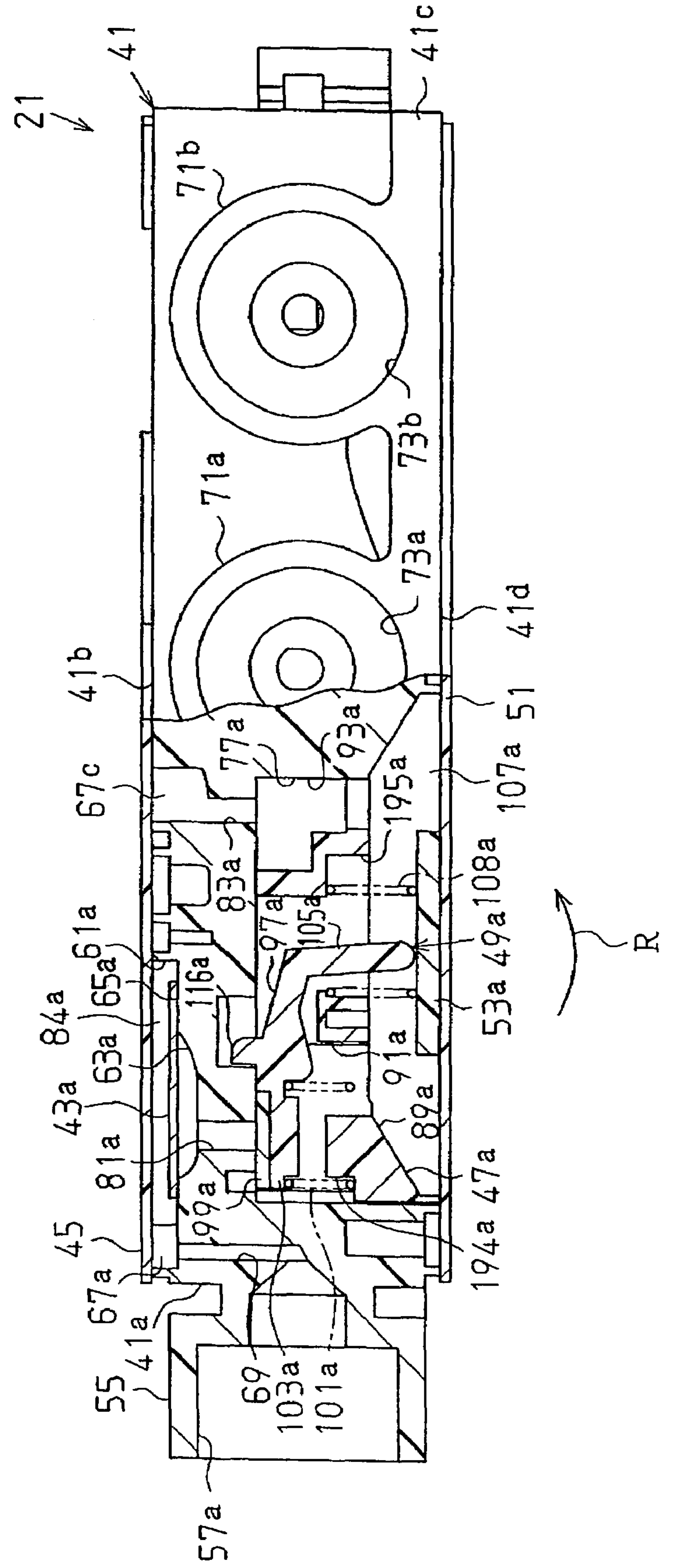
FIG. 15 is a cross-sectional view of main parts of a valve unit of another embodiment of this invention.
Figure 16:
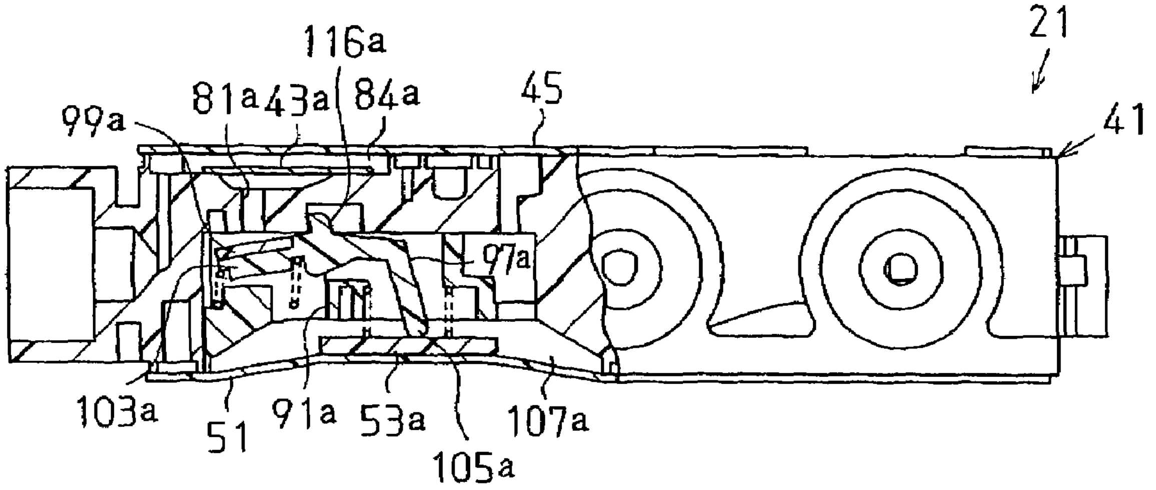
FIG. 16 is a cross-sectional view of a principal part showing the operation of the valve unit of FIG. 15.

In the above embodiment, the first and second valve elements 97*a* and 97*b* rotate by the first and second arc-shaped parts 104*a* and 104*b* thereof making a rolling movement while contacting the bottoms of the first and second fitting recess portions 77*a* and 77*b* (pressure chambers). However, the configuration is not limited thereto, and a configuration may be employed in which the first and second valve elements 97*a* and 97*b* rotate by an action other than a rolling movement as long as the first and second valve elements 97*a* and 97*b* can rotate in a non-fixed state. For example, as shown in FIG. 15 to FIG. 17, the fulcrum part may be planar.

In the above embodiment, first and second restriction portions 116*a* and 116*b* are provided in the first and second valve elements 97*a* and 97*b* as restriction portions. However, the restriction portion is not limited thereto, and may embody a different form as long as the restriction portion can restrict a further movement of the first and second valve elements 97*a* and 97*b* when the first and second valve elements 97*a* and 97*b* move away from the outlets of the communicating holes 81*a* and 81*b*. A configuration in which restriction portions are not provided in the first and second valve elements 97*a* and 97*b* may also be employed.

In the above embodiment, the first intermediate layer S2 of the first film member 45 is formed with aluminum foil. However, the material is not limited thereto, and the first intermediate layer S2 may be formed with alumina-deposition film or silica-deposition film. For example, the first protective film layer S1, on which alumina-deposition film or silica-deposition film is formed, is bonded to the first inner layer S3 with an adhesive.

In the above embodiment, the first protective film layer S1 of the first film member 45 is formed with polyethylene terephthalate. However, the material is not limited thereto, and the first protective film layer S1 may be formed with a polyamide. In this case, since the polyamide of the first protective film layer S1 also provides excellent gas shielding properties in addition to the gas shielding properties of the aluminum foil of the first intermediate layer S2, gas shielding properties are enhanced.

In the above embodiment, the second intermediate layer S5 of the second film member 51 is formed of alumina-deposition film. However, the material is not limited thereto, and the second intermediate layer S5 may be formed of silica-deposition film, or a material in which alumina-deposition film and silica-deposition film are adhered together may be used as the second intermediate layer S5. When formed in this manner, the same gas shielding properties are obtained.

In the above embodiment, the first and second inner layers S3 and S6 of the first and second film members 45 and 51 are formed of the same material as the unit case 41. However, the first and second inner layers S3 and S6 may be formed of a different material thereto that has an expansion coefficient that is the same as or close to the coefficient of thermal expansion of the unit case 41. In this case also, the first and second film members 45 and 51 are firmly adhered to the unit case 41.

With respect to the distribution rate of the flow volume between the first and second pressure chambers 107*a* and 107*b* and the first and second S-shaped channels 95*a* and 95*b*, the flow volume may be mechanically distributed by means of an open/close valve or the like.

An actuator or the like that directly deforms the second film member may be used in the apparatus.

As a flow controlling mechanism that varies the flow volume of ink upstream of the first and second pressure chambers 107*a* and 107*b* and the first and second S-shaped channels 95*a* and 95*b*, for example, a choke valve that regulates the flow volume by flattening the ink supply tube 35 may be employed.

The first film member 45 and the second film member 51 are not limited to the above three-layer structure, as long as they are formed by a flexible material with advanced gas shielding properties.

In the above embodiment, each of the valve units 21 includes two ink introducing chambers and two pressure chambers so that they handle two ink colors. However the configuration of the valve units 21 is not limited thereto, and the number of ink introducing chambers, pressure chambers and the like in each of the valve units 21 may be altered such that each of the valve units 21 handles one ink color, or three or more ink colors.

In the above embodiment, each ink cartridge 23 as a fluid cartridge is composed of the ink pack 32 as a liquid housing part and the ink case 31 as a pressure chamber. However, the fluid cartridge is not limited thereto, and may be composed by a different liquid housing part and pressure chamber. An embodiment of a different liquid housing part may include a part that forms a liquid housing part and a pressure chamber by partitioning an inner part of a housing or the like using a film or the like as a flexible member.

In the above embodiment, a liquid ejecting apparatus was described using the example of an inkjet recording apparatus 11 (including a printing apparatus such as a facsimile or copier) that discharges ink. However, the liquid ejecting apparatus is not limited thereto, and the apparatus may be a liquid ejecting apparatus that ejects a different liquid. Examples of a liquid ejecting apparatus that ejects a different liquid include a liquid ejecting apparatus that ejects a liquid such as an electrode material or coloring material used in production and the like of liquid crystal displays, EL (electroluminescent) displays and surface-emitting displays, a liquid ejecting apparatus that ejects a bioorganic matter used in biochip production, and a sample ejecting apparatus used as a precision pipette.

Although only a number of embodiments have been described herein, it will be clear to those skilled in the art that other characteristic embodiments of the present invention may be arrived at without deviating from the purport of the invention. This invention is not limited to the contents described herein, and may be improved within the scope of the attached claims.

The invention claimed is:

1. A valve unit provided part way along a liquid supply channel for supplying a liquid from a liquid reservoir part to a liquid ejecting head, the valve unit comprising:

a pressure chamber that temporarily retains the liquid, wherein a retained amount of liquid in the pressure chamber decreases as the liquid is ejected from the liquid ejecting head, and a pressure of the pressure chamber decreases accompanying the decrease in the retained amount of liquid; and an open/close valve that selectively permits supply of the liquid from the liquid supply channel to the pressure chamber;

the open/close valve comprising:

a valve seat provided between the liquid supply channel and the pressure chamber;

a valve element provided within the pressure chamber, wherein when the valve element contacts the valve seat, supply of the liquid from the liquid supply channel to the pressure chamber is prevented, and when the valve element is separated from the valve seat, supply of the liquid from the liquid supply channel to the pressure chamber is allowed; the valve element having a power point part, a fulcrum part and an application point part, wherein the power point part receives a pushing force in accordance with a decrease in pressure in the pressure chamber, the fulcrum part supports the valve element with respect to a wall surface defining the pressure chamber such that the valve element rotates as a result of the pushing force, the application point part separates from the valve seat accompanying rotation of the valve element caused by the pushing force, and the fulcrum part is not fixed to the wall surface; and an urging member that urges the application point part towards the valve seat, wherein the urging member and the valve seat face each other with the application point part in between.

2. The valve unit according to claim 1, wherein a contact site of the fulcrum part with respect to the wall surface changes as the valve element rotates.

3. The valve unit according to claim 1, wherein, as the valve element rotates the fulcrum part rolls on the wall surface in a state where the fulcrum part contacts the wall surface.

4. The valve unit according to claim 1, wherein the fulcrum part includes an arc-shaped surface that contacts the wall surface.

5. The valve unit according to claim 1, further comprising a restriction portion that restricts a movement of the valve element in a state where the application point part is separated from the valve seat.

6. The valve unit according to claim 1, wherein the valve element is formed in a roughly L-shape, and has the power point part at one end, has the application point part at another end, and has the fulcrum part between the power point part and the application point part.

7. The valve unit according to claim 1, further having:

a unit case, and a film member bonded by thermocompression to the unit case, wherein the film member and the unit case define the pressure chamber and an introducing chamber communicating with the pressure chamber, and wherein a liquid from the liquid reservoir part is introduced into the introducing chamber, the open/close valve selectively permits supply of a liquid from the introducing chamber to the pressure chamber, and the film member is formed of a material having a coefficient of thermal expansion that is the same as or close to that of the unit case.

8. The valve unit according to claim 7, wherein the unit case has a recess portion, and the pressure chamber and the introducing chamber are defined by the film member sealing the recess portion.

9. The valve unit according to claim 7, wherein a material of the film member is the same as a material of the unit case.

10. The valve unit according to claim 7, wherein the unit case is made with polypropylene.

11. The valve unit according to claim 1, further comprising:

a unit case; and a film member bonded by thermocompression to the unit case, wherein the film member and the unit case define the pressure chamber and an introducing chamber communicating with the pressure chamber, and wherein a liquid from the liquid reservoir part is introduced into the introducing chamber, and the open/close valve selectively permits supply of a liquid from the introducing chamber to the pressure chamber;

wherein the film member has at least a protective film layer, an intermediate layer and an inner layer, the inner layer being bonded by thermocompression to the unit case, and the inner layer being formed of a material having a coefficient of thermal expansion that is the same as or close to that of the unit case.

12. The valve unit according to claim 11, wherein a material of the inner layer is the same as a material of the unit case.

13. The valve unit according to claim 11, wherein the unit case is made with polypropylene.

14. The valve unit according to claim 11, wherein the inner layer is made with polypropylene, and a thickness of the inner layer is 20 microns or more.

15. The valve unit according to claim 11, wherein the protective film layer is made with polyethylene terephthalate.

16. The valve unit according to claim 15, wherein a thickness of the protective film layer is 6 microns or more.

17. The valve unit according to claim 11, wherein the intermediate layer is formed with aluminum foil, silica-deposition film or alumina-deposition film.

18. The valve unit according to claim 11, wherein the intermediate layer is formed with aluminum foil, and a thickness of the intermediate layer is 5 microns or more.

19. The valve unit according to claim 1, further comprising:

a unit case;

a first flexible member attached to the unit case, wherein the first flexible member and the unit case define an introducing chamber communicating with the pressure chamber, and wherein a liquid from the liquid reservoir part is supplied to the introducing chamber, and the open/close valve selectively permits supply of a liquid from the introducing chamber to the pressure chamber; and a second flexible member attached to the unit case, wherein the second flexible member and the unit case define the pressure chamber.

20. The valve unit according to claim 19, wherein the unit case has a step in the introducing chamber, the first flexible member is positioned facing the step, and the first flexible member is capable of contacting and separating from the step by changing shape in accordance with a difference between the internal and external pressures of the introducing chamber, the liquid supply channel being blocked by contact of the first flexible member with the step.

21. The valve unit according to claim 19, the unit case comprising:

a bubble trapping channel composing one part of the liquid supply channel and including the pressure chamber, wherein the pressure chamber functions as a bubble reservoir that is capable of trapping bubbles contained in the liquid; and a non-bubble trapping channel composing one part of the liquid supply channel and disposed in parallel with the bubble trapping channel, wherein a cross-sectional area of the non-bubble trapping channel is designed to be capable of transporting the bubbles in resistance to a buoyant force of the bubbles;

wherein a rate of distribution with respect to a flow amount of liquid flowing in the bubble trapping channel and a flow amount of liquid flowing in the non-bubble trapping channel changes due to deformation of the second flexible member.

22. The valve unit according to claim 21, the bubble trapping channel further comprising:

a liquid inflow hole that allows the liquid to flow into the pressure chamber; and a liquid outflow hole that allows the liquid to flow out from the pressure chamber;

wherein, the liquid inflow hole and the liquid outflow hole are provided in a position below a ceiling part of the pressure chamber;

a volume of the pressure chamber changes from a first volume to volume in a range between the first volume and a second volume that is smaller than the first volume due to deformation of the second flexible member, whereby a channel resistance of the bubble trapping channel changes from a first channel resistance value to a channel resistance value in a range between the first channel resistance value and a second channel resistance value that is larger than the first channel resistance value;

the size of a channel resistance of the non-bubble trapping channel is designed to be within a range between the first channel resistance value and the second channel resistance value;

the second flexible member is deformed by a difference between the internal and external pressures of the pressure chamber; and the non-bubble trapping channel meanders.

23. A valve unit provided part way along a liquid supply channel for supplying a liquid from a liquid reservoir part to a liquid ejecting head, the valve unit comprising:

a pressure chamber that temporarily retains the liquid, wherein a retained amount of liquid in the pressure chamber decreases as the liquid is ejected from the liquid ejecting head, and a pressure of the pressure chamber decreases accompanying the decrease in the retained amount of liquid; and an open/close valve that selectively permits supply of the liquid from the liquid supply channel to the pressure chamber;

the open/close valve having:

a valve seat provided between the liquid supply channel and the pressure chamber; and a valve element provided within the pressure chamber, wherein when the valve element contacts the valve seat, supply of the liquid from the liquid supply channel to the pressure chamber is prevented, and when the valve element is separated from the valve seat, supply of the liquid from the liquid supply channel to the pressure chamber is allowed; the valve element being formed in a roughly L-shape and having a power point part at one end thereof, an application point part at the other end thereof, and a fulcrum part between the power point part and the application point part, wherein the power point part receives a pushing force in accordance with a decrease in pressure in the pressure chamber, the fulcrum part supports the valve element with respect to a wall surface defining the pressure chamber such that the valve element rotates as a result of the pushing force, the application point part separates from the valve seat accompanying rotation of the valve element caused by the pushing force, and the fulcrum part is not fixed to the wall surface.

24. The valve unit according to claim 23, wherein a contact site of the fulcrum part with respect to the wall surface changes as the valve element rotates.

25. A liquid ejecting apparatus, the apparatus comprising:

a liquid reservoir part that retains a liquid;

a liquid ejecting head having a nozzle, wherein the head ejects a liquid from the nozzle towards a target;

a liquid supply channel for supplying a liquid from the liquid reservoir part to the liquid ejecting head; and a valve unit provided part way along the liquid supply channel;

the valve unit comprising:

a pressure chamber that temporarily retains the liquid, wherein a retained amount of liquid in the pressure chamber decreases as the liquid is ejected from the liquid ejecting head, and a pressure of the pressure chamber decreases accompanying the decrease in the retained amount of liquid; and an open/close valve that selectively permits supply of the liquid from the liquid supply channel to the pressure chamber;

the open/close valve comprising:

a valve seat provided between the liquid supply channel and the pressure chamber;

a valve element provided within the pressure chamber, wherein when the valve element contacts the valve seat, supply of the liquid from the liquid supply channel to the pressure chamber is prevented, and when the valve element is separated from the valve seat, supply of the liquid from the liquid supply channel to the pressure chamber is allowed; the valve element having a power point part, a fulcrum part and an application point part, wherein the power point part receives a pushing force in accordance with a decrease in pressure in the pressure chamber, the fulcrum part supports the valve element with respect to a wall surface defining the pressure chamber such that the valve element rotates as a result of the pushing force, the application point part separates from the valve seat accompanying rotation of the valve element caused by the pushing force, and the fulcrum part is not fixed to the wall surface; and an urging member that urges the application point part towards the valve seat, wherein the urging member and the valve seat face each other with the application point part in between.

26. The apparatus according to claim 25, wherein a contact site of the fulcrum part with respect to the wall surface changes as the valve element rotates.

27. The apparatus according to claim 25, further having:

a unit case; and a film member bonded by thermocompression to the unit case, wherein the film member and the unit case define the pressure chamber and an introducing chamber communicating with the pressure chamber, a liquid from the liquid reservoir part being introduced to the introducing chamber, and the open/close valve selectively permitting supply of a liquid from the introducing chamber to the pressure chamber;

wherein the film member has at least a protective film layer, an intermediate layer and an inner layer, the inner layer being bonded by thermocompression to the unit case, and the inner layer being formed of a material having a coefficient of thermal expansion that is the same as or close to that of the unit case.

28. The apparatus according to claim 25, further comprising:

a unit case;

a flexible member attached to the unit case, wherein the flexible member and the unit case define an introducing chamber communicating with the pressure chamber, a liquid from the liquid reservoir part being supplied to the introducing chamber, and the open/close valve selectively permitting supply of a liquid from the introducing chamber to the pressure chamber;

a suction mechanism that draws the liquid from the liquid ejecting head; and a pressure regulating mechanism that regulates the pressure of a fluid within the liquid supply channel on an upstream side of the flexible member;

wherein the unit case has a step in the introducing chamber, the flexible member is positioned facing the step, and the flexible member is capable of contacting and separating from the step by changing shape according to a difference between the internal and external pressures of the introducing chamber, the liquid supply channel being blocked by contact of the flexible member with the step.

29. The apparatus according to claim 25, further comprising:

a unit case; and a flexible member attached to the unit case, wherein the flexible member and the unit case define the pressure chamber;

the unit case comprising:

a bubble trapping channel composing one part of the liquid supply channel and including the pressure chamber, wherein the pressure chamber functions as a bubble reservoir that is capable of trapping bubbles contained in the liquid; and a non-bubble trapping channel composing one part of the liquid supply channel and disposed in parallel with the bubble trapping channel, wherein a cross-sectional area of the non-bubble trapping channel is designed to be capable of transporting the bubbles in resistance to a buoyant force of the bubbles;

wherein the apparatus further includes a distribution mechanism that deforms the flexible member to change a rate of distribution with respect to a flow amount of liquid flowing in the bubble trapping channel and a flow amount of the liquid flowing in the non-bubble trapping channel.

30. The apparatus according to claim 29, wherein, by deforming the flexible member by generating a pressure difference between the internal and external pressures of the pressure chamber, the distribution mechanism changes a volume of the pressure chamber from a first volume to a volume in a range between the first volume and a second volume that is smaller than the first volume, whereby a channel resistance of the bubble trapping channel changes from a first channel resistance value to a channel resistance value in a range between the first channel resistance value and a second channel resistance value that is larger than the first channel resistance value;

wherein the size of a channel resistance of the non-bubble trapping channel is designed to be within a range between the first channel resistance value and the second channel resistance value.

31. The apparatus according to claim 30, further comprising:

a flow controlling mechanism that changes the flow amount of a liquid flowing in a part of the liquid supply channel that is upstream than the bubble trapping channel and the non-bubble trapping channel; and a suction mechanism that draws the liquid from the liquid ejecting head.

* * * * *